US012630017B2

(12) United States Patent
Buth et al.

(10) Patent No.: US 12,630,017 B2
(45) Date of Patent: May 19, 2026

(54) DYNAMICALLY BENDABLE COVER PANELS FOR AUTO DISPLAY

(71) Applicant: CORNING INCORPORATED, Corning, NY (US)

(72) Inventors: Wesley J Buth, Corning, NY (US); Scott Steven Cronk, Webster, NY (US); Thomas Augustus Keebler, Corning, NY (US); Evan Gray Kister, Painted Post, NY (US); Eric Lee Miller, Corning, NY (US); Jason Scott Stewart, Hornell, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 18/888,890

(22) Filed: Sep. 18, 2024

(65) Prior Publication Data

US 2025/0010715 A1 Jan. 9, 2025

Related U.S. Application Data

(63) Continuation of application No. 17/619,097, filed as application No. PCT/US2020/038319 on Jun. 18, 2020, now Pat. No. 12,227,073.

(Continued)

(51) Int. Cl.
*B60K 35/10* (2024.01)
*B60K 35/22* (2024.01)
(Continued)

(52) U.S. Cl.
CPC ............ *B60K 35/10* (2024.01); *B60K 35/223* (2024.01); *B60K 35/53* (2024.01); *B60K 35/22* (2024.01);
(Continued)

(58) Field of Classification Search
CPC ...... B60K 35/10; B60K 35/223; B60K 35/53; B60K 35/22; B60K 35/415; B60K 35/425;
(Continued)

(56) References Cited

U.S. PATENT DOCUMENTS

| | | | |
|---|---|---|---|
| 7,622,050 B2 | 11/2009 | Otsuka et al. | |
| 8,454,079 B2 * | 6/2013 | Yoshida | B21D 7/08 296/203.02 |

(Continued)

FOREIGN PATENT DOCUMENTS

| | | |
|---|---|---|
| CN | 106601130 A | 4/2017 |
| CN | 106601131 A | 4/2017 |

(Continued)

OTHER PUBLICATIONS

Anonymous, Display System for a Vehicle, IP,com (Year: 2004).
(Continued)

*Primary Examiner* — Marnie A Matt
(74) *Attorney, Agent, or Firm* — Daniel J. Greenhalgh

(57) ABSTRACT

A display assembly for an automotive interior comprises a dynamically bendable cover panel having first and second panel portions a flexible panel portion connecting the first and second panel portions, a display positioned adjacent the first and second panel portions, and a frame that supports the cover panel and comprises a first frame portion for supporting the first panel portion, a second frame portion for supporting the second panel portion, and a hinge portion coupling the first frame portion and the second frame portion, the hinge portion configured to induce a curvature having smoothly connected arc segments in the flexible panel portion between the first panel portion and the second (Continued)

panel portion when the second frame portion is articulated relative to the first frame portion from a straight position to a deployed position.

20 Claims, 16 Drawing Sheets

Related U.S. Application Data

(60) Provisional application No. 62/864,155, filed on Jun. 20, 2019.

(51) Int. Cl.
*B60K 35/53* (2024.01)
*B60K 35/40* (2024.01)

(52) U.S. Cl.
CPC .......... *B60K 35/415* (2024.01); *B60K 35/425* (2024.01); *B60K 2360/688* (2024.01)

(58) Field of Classification Search
CPC .. B60K 2360/688; B60K 35/60; B60K 35/00; B60K 35/50; G06F 1/1637; G06F 1/1641; H05K 7/16
USPC .......................................................... 296/70
See application file for complete search history.

(56) References Cited

U.S. PATENT DOCUMENTS

| | | | |
|---|---|---|---|
| 9,086,850 B2 * | 7/2015 | Verschoor ............. G06F 1/1652 |
| 9,204,565 B1 | 12/2015 | Lee et al. |
| 9,710,021 B2 | 7/2017 | Kauhaniemi et al. |
| 9,786,207 B2 | 10/2017 | Kim et al. |
| 9,946,310 B1 | 4/2018 | Huang et al. |
| 9,971,448 B2 | 5/2018 | Franklin et al. |
| 10,209,801 B2 | 2/2019 | Kauhaniemi et al. |
| 2003/0160754 A1 | 8/2003 | Hanson et al. |
| 2004/0115852 A1 | 6/2004 | Park et al. |
| 2012/0152897 A1 | 6/2012 | Cheng et al. |
| 2013/0271697 A1 | 10/2013 | Deforest et al. |
| 2014/0285476 A1 | 9/2014 | Cho et al. |
| 2015/0210588 A1 | 7/2015 | Chang et al. |
| 2015/0257290 A1 | 9/2015 | Lee |
| 2015/0357387 A1 | 12/2015 | Lee et al. |
| 2016/0195901 A1 | 7/2016 | Kauhaniemi et al. |
| 2016/0282899 A1 | 9/2016 | Inagaki et al. |
| 2017/0060188 A1 | 3/2017 | Han et al. |
| 2017/0061836 A1 | 3/2017 | Kim et al. |
| 2017/0123455 A1 | 5/2017 | Park et al. |
| 2018/0107250 A1 | 4/2018 | Cho |
| 2018/0113493 A1 * | 4/2018 | Silvanto ............. E05D 11/0054 |
| 2018/0213663 A1 * | 7/2018 | Lin ..................... E05D 11/0054 |
| 2018/0314299 A1 * | 11/2018 | Xia ....................... H04M 1/022 |
| 2020/0170127 A1 | 5/2020 | Kim |
| 2021/0181798 A1 * | 6/2021 | Koo .................... H05K 1/0306 |
| 2022/0322547 A1 | 10/2022 | Wang et al. |

FOREIGN PATENT DOCUMENTS

| | | |
|---|---|---|
| EP | 0228789 A3 | 7/1988 |
| JP | 2013-188993 A | 9/2013 |
| KR | 10-2015-0088605 A | 8/2015 |
| KR | 10-2016-0083318 A | 7/2016 |
| KR | 10-1894456 B1 | 9/2018 |
| KR | 10-2018-0107358 A | 10/2018 |
| KR | 2019-0001864 A | 1/2019 |
| KR | 10-2019-0049242 A | 5/2019 |
| TW | 201515334 A | 4/2015 |
| WO | 2015/171889 A1 | 11/2015 |
| WO | 2016/073549 A1 | 5/2016 |
| WO | 2016/073551 A1 | 5/2016 |
| WO | 2018/198307 A1 | 11/2018 |

OTHER PUBLICATIONS

C. Yang and P. Liu, "Finite element analysis of arc flexible hinge stress," 2013 2nd International Symposium on Instrumentation and Measurement, Sensor Network and Automation (IMSNA), Toronto, ON, Canada, 2013, pp. 978-981, doi: 10.1109/IMSNA.2013.6743444 (Year: 2013).

International Search Report and Written Opinion of the International Searching Authority; PCT/US2020/038319; Mailed Dec. 9, 2020; 19 Pages; European Patent Office.

Johnson et al., "Surface stresses of mixed-mode grinding materials on borosilicate glass", Applied Optics, vol. 51, No. 18, 2012, 6 pages.

Namba et al., "Precision finishing and fracture strength of ultra-low thermal expansion glass-ceramics and their sintered bodies for ultra-precision applications" Journal of the Japan Society for Precision Engineering, Mar. 2018, 8 pages.

Taiwanese Patent Application No. 109120714, Office Action dated Jul. 8, 2024, 6 pages (English Translation only), Taiwanese Patent Office.

Uchiike et al., "Secondary electron emission from insulators by ion bombardment", J-STAGE home/Shinku/vol. 16, Issue 5, 1973, 6 pages.

W. Hu, Q. He, B. Yang, S. Guo, W. Zhao and J. Zhang, "Design of a Novel Active Joint Mechanism for Solar Panels," 2017 5th International Conference on Mechanical, Automotive and Materials Engineering (CMAME), Guangzhou, China, 2017, pp. 174-177, doi: 10.1109/CMAME.2017.8540148. (Year: 2017).

Wang et al., "Investigation of surface mass transport in Al—Si—Ca-Oxide glasses via the thermal induced decay of submicron surface gratings", Journal of Applied Physics vol. 101, 2007, 10 pages.

Won et al., "Effect of Mechanical and Electrical Stresses on the Performances of an a-Si:H TFT on Plastic Substrate", Journal of the Electrochemical Society, vol. 42, 2003, 3 pages.

Korean Patent Application No. 10-2022-7002219, Office Action dated Sep. 23, 2025, 4 pages (English Translation only), Korean Patent Office.

* cited by examiner

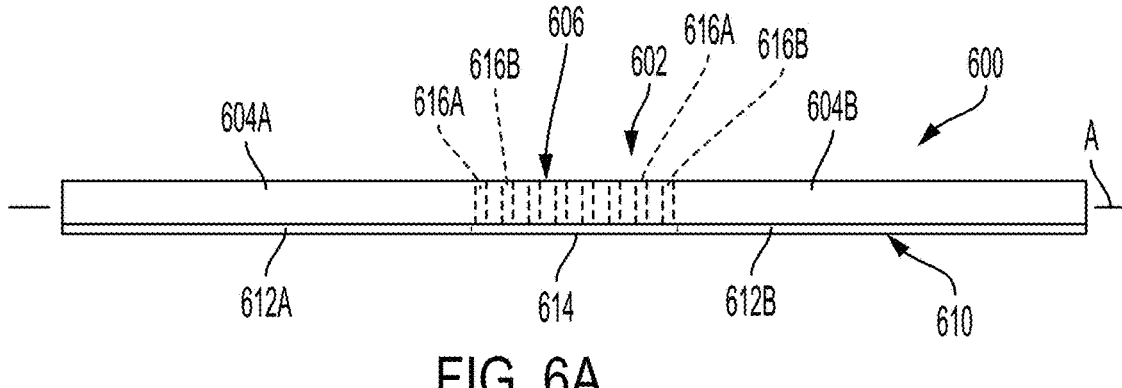
FIG. 6A
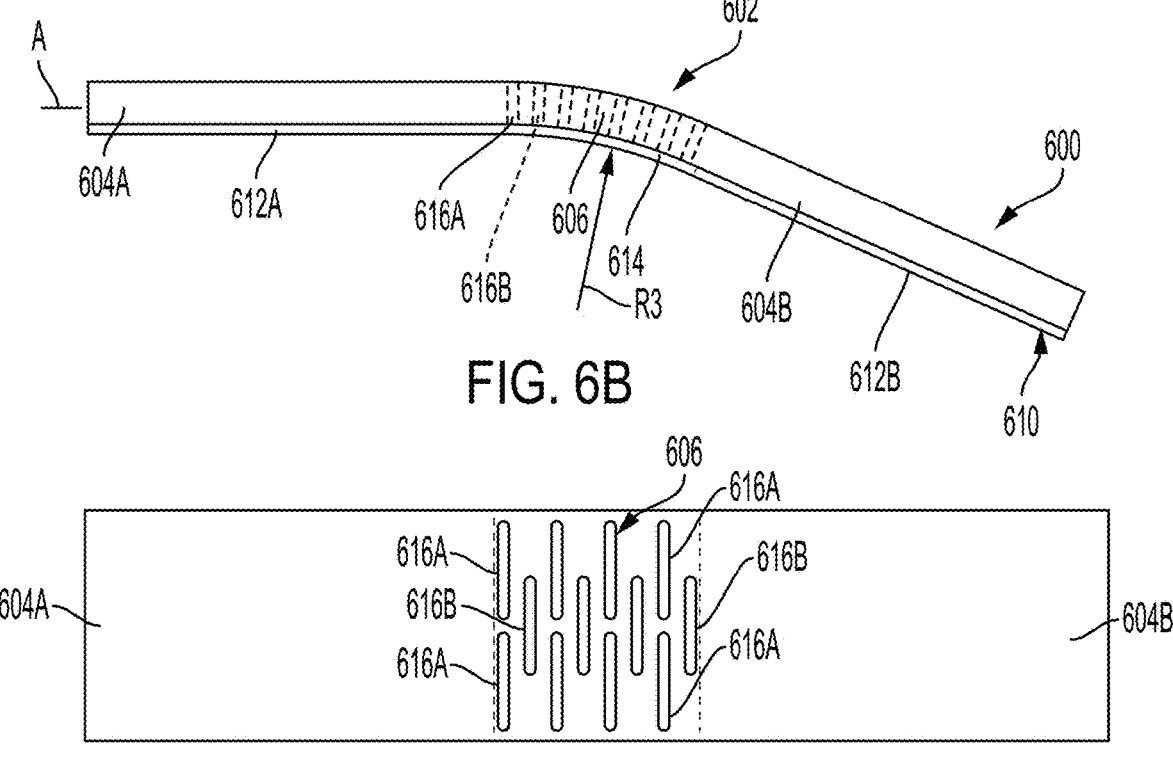
FIG. 6B
FIG. 6C

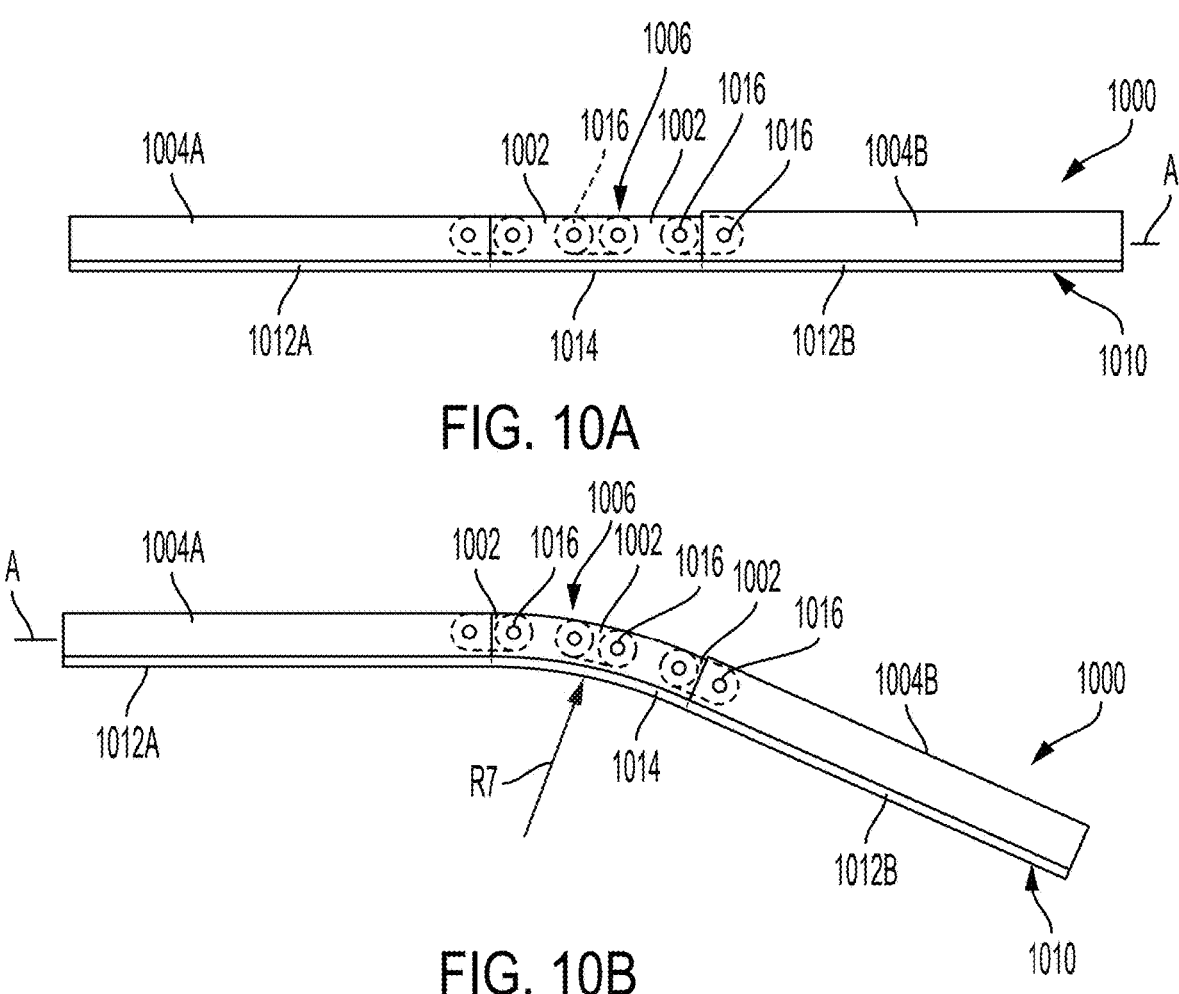
FIG. 10A
FIG. 10B
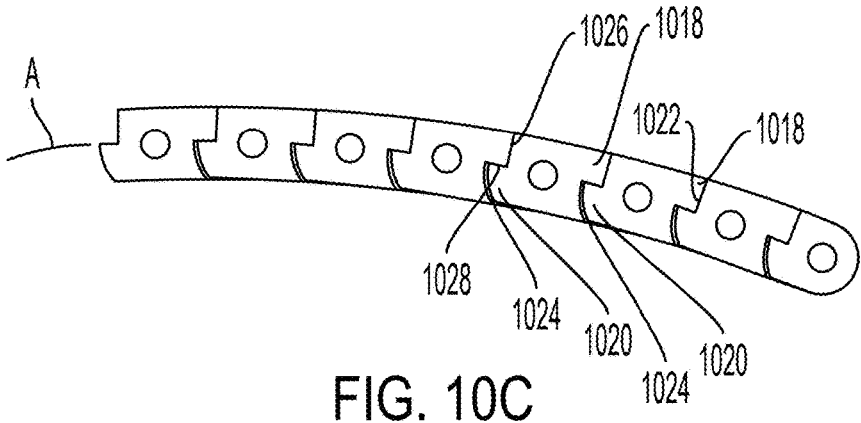
FIG. 10C

DYNAMICALLY BENDABLE COVER PANELS FOR AUTO DISPLAY

CROSS-REFERENCE TO RELATED APPLICATIONS

This application is a continuation of, and claims priority to U.S. patent application Ser. No. 17/619,097, filed on Dec. 14, 2021, which claims the benefit of priority under 35 U.S.C. § 371 of International Application No. PCT/US2020/038319, filed on Jun. 18, 2020, which claims the benefit of priority under 35 U.S.C. § 119 of U.S. Provisional Application Ser. No. 62/864,155 filed on Jun. 20, 2019 the content of which are relied upon and incorporated herein by reference in their entirety.

TECHNICAL FIELD

This document pertains generally, but not by way of limitation, to dynamically bendable automotive interior display systems. More specifically, but not by way of limitation, the present application relates to dynamically bendable automotive interior display systems with supports that can dynamically and reversibly bend cover substrates between forward-bent, straight and backward-bent positions.

BACKGROUND

Automotive interiors systems can include surfaces that incorporate displays and/or touch panels and cover substrates disposed over the displays and/or touch panels. There is a desire to change the shape of the surfaces and in particular, to dynamically change the shape of the surface according to the needs or preferences of a viewer, such as a driver or a passenger. Such dynamic movements should still allow the automotive interiors systems to meet rigorous headform impact test (HIT) requirements. In some instances, the cover substrate should not break after being impacted in the HIT. Accordingly, there is a need for dynamically bendable cover substrates and automotive interior display systems that exhibit improved headform impact performance.

Overview

The present inventors have recognized, among other things, that problems to be solved in automotive displays and touch panels include the need to strengthen dynamically bendable cover substrates, such as those that can become separated or unsupported by the interior structure to which they are attached. In particular, in dynamically bendable cover substrates, a first portion of the substrate is articulated to an off-angle relative to a second portion of the substrate. Thus, while the second portion can remain fully supported by the interior structure, e.g., a dashboard, the first portion can become cantilevered such that only a backing or frame for the substrate is supporting the first portion. Thus, the present inventors have recognized that there is a need for dynamically bendable cover substrates to have frame structures that can support the substrate, such as to prevent shattering.

The present inventors have also recognized, among other things, that problems to be solved in automotive displays and touch panels include the need to control bending of the cover substrate in dynamically bendable cover substrates, such as to provide a smooth curvature. The present inventors have recognized that substrates, such as glass substrates, tend to naturally bend along a parabolic curvature that can form a discontinuity between panel portions joined by the parabolic curvature. Thus, the present inventors have recognized that there is a need for dynamically bendable cover substrates to have frame structures that can control bending and curvature of the cove substrate, such as to provide an aesthetically appealing curvature.

The present subject matter can help provide solutions to these problems and other problems, such as by providing a frame structure that can both influence, and, if desired, completely dictate, the curvature of a dynamically bendable cover substrate and provide sufficient support to the cover substrate to meet HIT requirements, whether supported by an automotive interior structure or cantilevered therefrom.

In an example, a display assembly for an automotive interior comprises a dynamically bendable cover panel having first and second panel portions a flexible panel portion connecting the first and second panel portions, at least one display positioned adjacent the first and second panel portions, respectively, and a frame that supports the cover panel and comprises a first frame portion for supporting the first flat panel portion, a second frame portion for supporting the second panel portion, and a hinge portion coupling the first frame portion and the second frame portion, the hinge portion configured to induce a curvature having smoothly connected arc segments in the flexible panel portion between the first panel portion and the second panel portion when the second frame portion is articulated relative to the first frame portion from a straight position to a deployed position. In one or more embodiments, the display comprises more than one display screen. In one or more embodiments, the display comprises a first display screen and a second display screen, wherein the first display portion is adjacent the first panel portion and the second display portion is adjacent the second panel portion.

In another example, a display assembly for an automotive interior comprises a dynamically bendable cover panel comprising a first panel portion, a second panel portion and a flexible panel portion connecting the first panel portion and the second flat panel portion; a display adjacent the first panel portion and the second panel portion; and a frame supporting the dynamically bendable cover panel comprising a first frame portion for supporting the first panel portion, a second frame portion for supporting the second panel portion and a living hinge coupling the first frame portion and the second frame portion. In one or more embodiments, the display comprises more than one display screen. In one or more embodiments, the display comprises a first display screen and a second display screen, wherein the first display portion is adjacent the first panel portion and the second display portion is adjacent the second panel portion.

In an additional example, a display assembly for an automotive interior comprises a dynamically bendable cover panel comprising a first panel portion, a second panel portion and a flexible panel portion connecting the first panel portion and the second panel portion; a display adjacent the first panel portion and the second panel portion; a frame supporting the dynamically bendable cover panel comprising a first frame portion for supporting the first panel portion, a second frame portion for supporting the second panel portion and a hinge portion coupling the first frame portion and the second frame portion; and a mandrel positioned behind the flexible panel portion, the mandrel having the shape of the circular arc segment. In one or more embodiments, the display comprises more than one display screen. In one or more embodiments, the display comprises a first display screen and a second display screen, wherein the first display portion is adjacent the first panel portion and the second display portion is adjacent the second panel portion.

In yet another example, a display assembly for an automotive interior comprises a dynamically bendable cover panel comprising a first panel portion, a second panel portion and a flexible panel portion connecting the first panel portion and the second panel portion; a display adjacent the first panel portion and the second panel portion; and a frame supporting the dynamically bendable cover panel comprising a first frame portion for supporting the first panel portion, a second frame portion for supporting the second panel portion and a plurality of hinge linkages pinned to the first frame portion and the second frame portion. In one or more embodiments, the display comprises more than one display screen. In one or more embodiments, the display comprises a first display screen and a second display screen, wherein the first display portion is adjacent the first panel portion and the second display portion is adjacent the second panel portion.

In still another example, a display assembly for an automotive interior comprises a dynamically bendable cover panel comprising a first panel portion, a second panel portion and a flexible panel portion connecting the first panel portion and the second panel portion; a display adjacent the first panel portion and second panel portion; and a frame supporting the dynamically bendable cover panel comprising a first frame portion for supporting the first panel portion, a second frame portion for supporting the second panel portion and a sliding hinge mechanism coupling the first frame portion and the second frame portion. In one or more embodiments, the display comprises more than one display screen. In one or more embodiments, the display comprises a first display screen and a second display screen, wherein the first display portion is adjacent the first panel portion and the second display portion is adjacent the second panel portion.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

FIGS. 6A and 6B are side schematic views of a cover substrate attached to a frame having a third embodiment of a living hinge comprising patterned relief cuts in straight and bent configurations, respectively.

FIG. 6C is a top plan view of the cover substrate of FIGS. 6A and 6B.

FIGS. 10A and 10B are side schematic views of a cover substrate attached to a frame having a first embodiment of a linked hinge comprising interlocking links in straight and bent configurations, respectively.

FIG. 10C is a cross-sectional view of the frame of FIG. 10B showing overhanging flex arrestors of the interlocking links.

Figure 1:
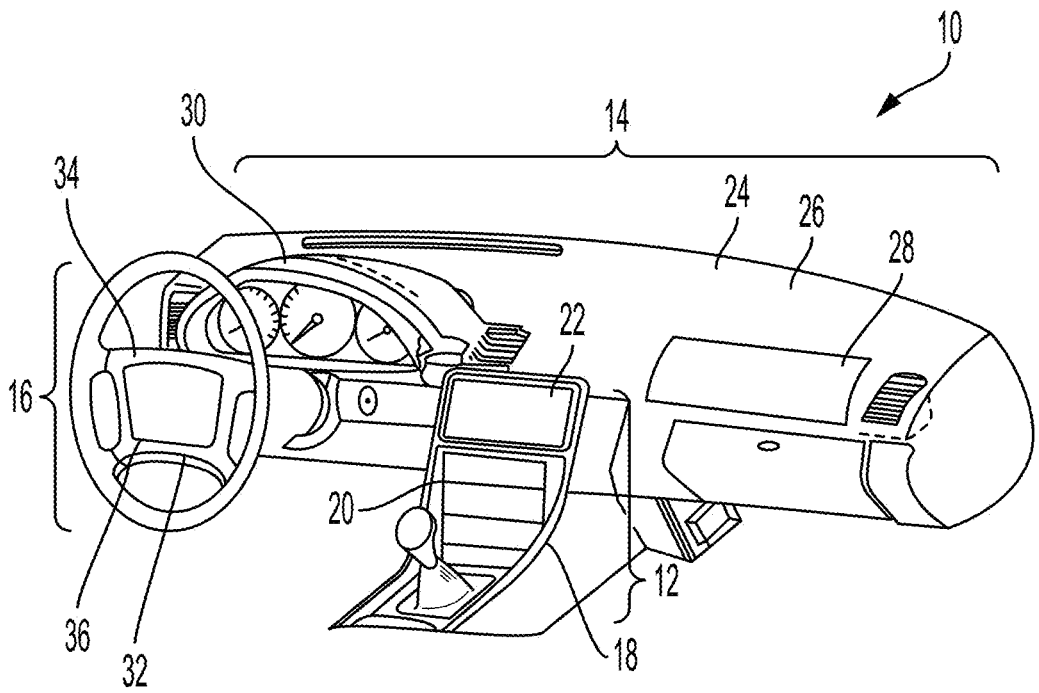
FIG. 1 is a perspective view of a vehicle interior with vehicle interior systems utilizing a display having a cover substrate with a deformable hinge, as are discussed herein in detail with reference to FIGS. 4A-15.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

FIG. 1 shows vehicle interior 10 that includes three different vehicle interior systems 12, 14 and 16 according to various examples. Vehicle interior system 12 includes center console base 18 with curved surface 20 including a display, shown as curved display 22. Vehicle interior system 14 includes dashboard base 24 with curved surface 26 including curved display 28. Dashboard base 24 typically includes instrument panel 30 (or center console, not shown) which may also include a curved display. Vehicle interior system 16 includes dashboard steering wheel base 32 with curved surface 34 and display curved display 36. In one or more embodiments, the vehicle interior system may include a base that is an arm rest, a pillar, a seat back, a floor board, a headrest, a door panel, or any portion of the interior of a vehicle that includes a curved surface.

The surfaces and curved surfaces of vehicle interior system 12, 14 and 16 can include various electronic displays. It is desirable for those electronic displays to satisfy headform impact test (HIT) requirements as well as to be repositionable, such as for different sized users or different numbers of users within the vehicle.

Figure 2A:
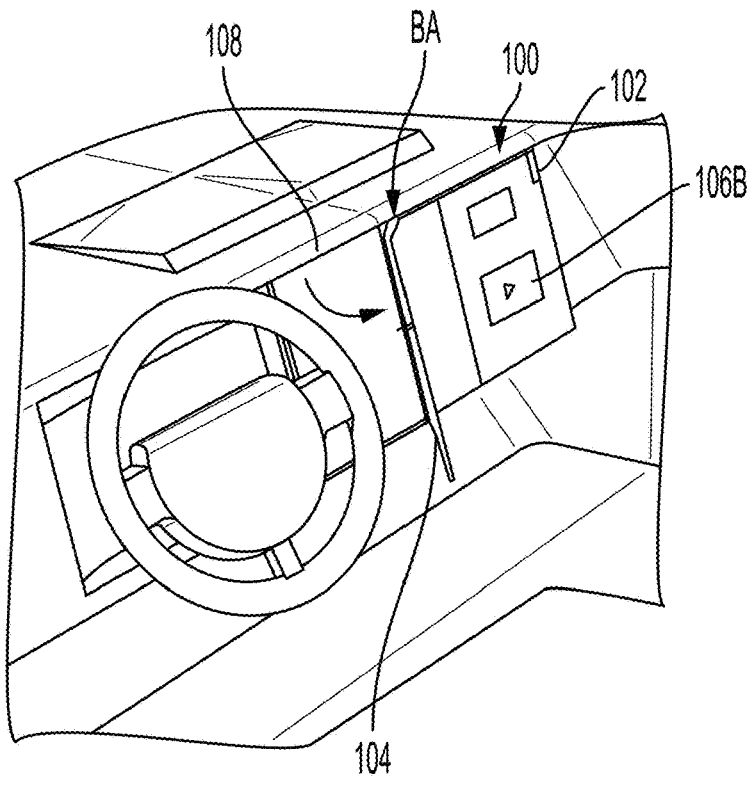
FIGS. 2A and 2B show perspective front views of an automotive interior display system with a dynamically bendable cover substrate in a deployed or deflected positions relative to a straight or extended position.
Figure 2B:
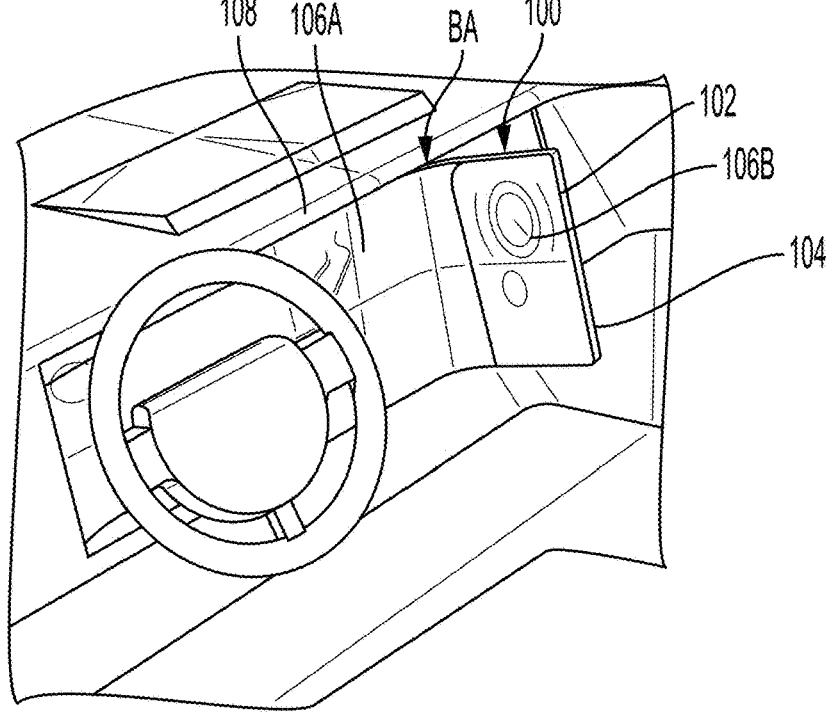

FIGS. 2A and 2B show perspective front views of dynamically bendable automotive interior display system 100 with the cover substrate having a cold-bent portion and being dynamically bent from a straight or extended position to deployed or deflected positions. In examples, the deployed position can produce a constant radius of curvature between straight portions. A constant radius of curvature can result in a circular shaped cold-bent portion. However, in other examples, the cold-bent portion can have other curvatures, such as parabolic.

As shown in FIG. 2A, system 100 can include cover substrate 102 that can be dynamically bent along a radius of curvature along bend axis BA and frame 104 that can be positioned behind cover substrate 102 to support cover substrate 102 and electronics mounted thereto. First display electronics 106A can be disposed under a first side of cover substrate 102 on one side of bend axis BA and second display electronics 106B can be disposed under a second side of cover substrate 102 on another side of bend axis BA.

It is desirable for bend axis BA to produce a radius of curvature that is maintained through all stages of flexion between first display electronics 106A and second display electronics 106B. For example, in a straight configuration where both of display electronics 106A and 106B are pushed back against dashboard base 108, there will be no radius of curvature. However, as one of display electronics 106A and 106B is moved forward from dashboard base 108, a small radius of curvature will form between display electronics 106A and 106B. Initially, the arc length for the radius of curvature will be small. But, as one of display electronics 106A and 106B moves further away from dashboard base 108, the arc length will grow, but will have the same radius of curvature. The present disclosure describes support devices that can be positioned behind cover substrate 102 to influence the bending of cover substrate 102 about bending axis BA, such as at a constant radius of curvature or some other curvature including parabolic, while providing sufficient support to pass HIT requirements. The present application is described with reference to dynamically bendable displays that can produce circular curvatures. However, it is understood that the mechanisms described herein can be adapted to produce other curvatures.

Figure 3A:
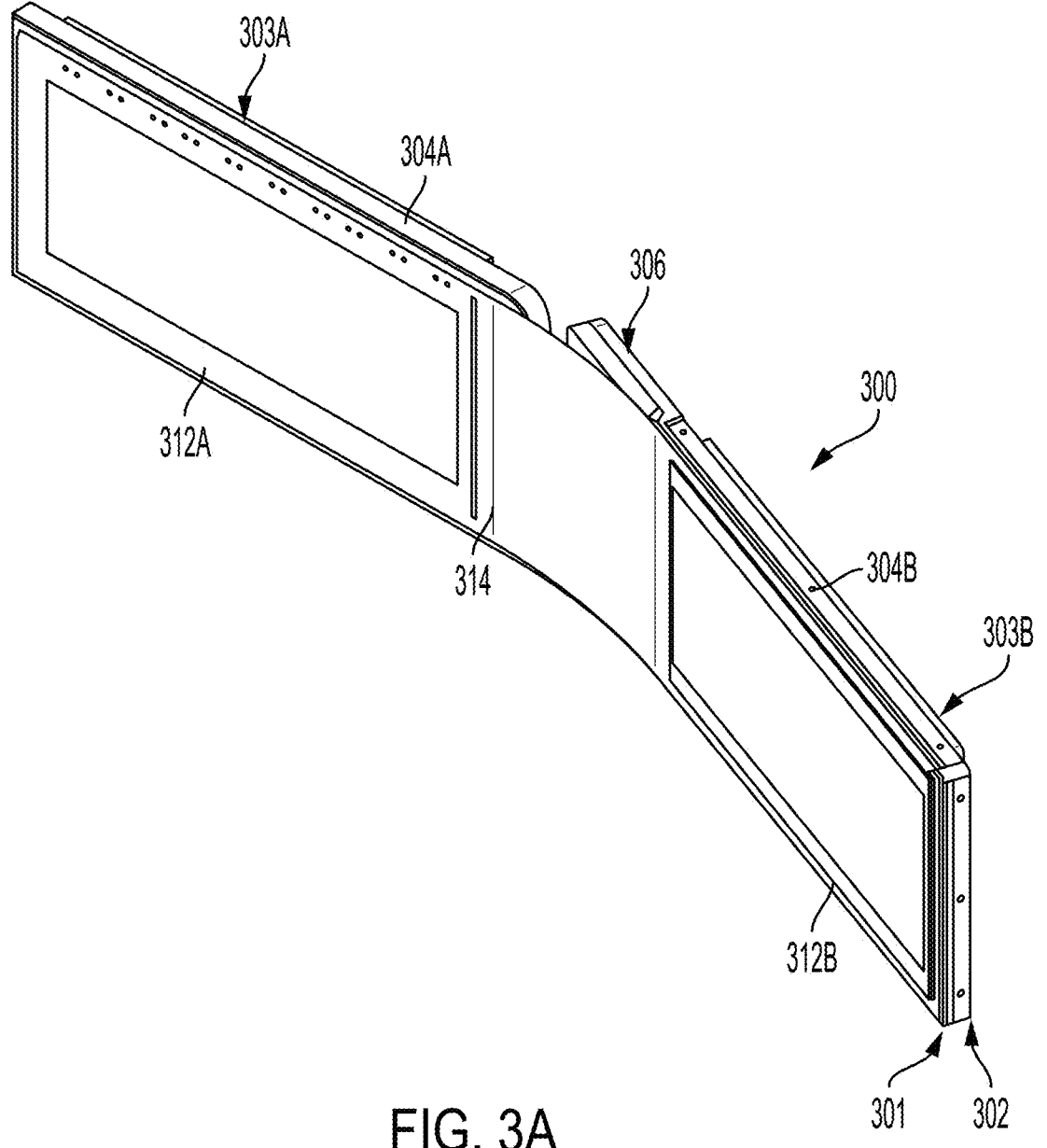
FIG. 3A is a perspective view of a dynamically bendable automotive interior display system comprising a cover substrate, a frame and electronic display panels.
Figure 3B:
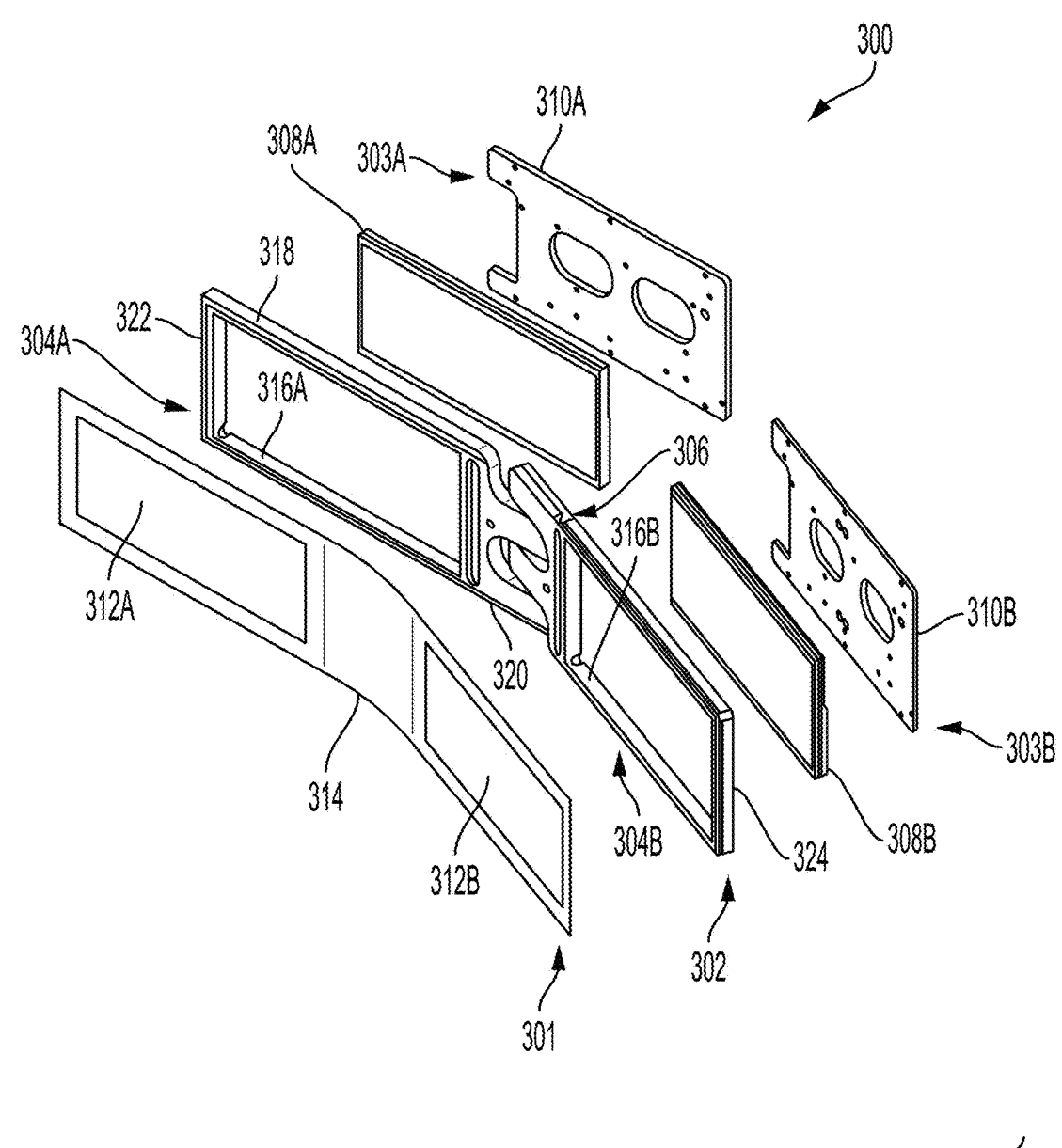
FIG. 3B is an exploded view of the dynamically bendable automotive interior display system of FIG. 3A.

FIG. 3A is a perspective view of dynamically bendable automotive interior display system 300 comprising cover substrate 301, frame 302 and display electronics assemblies 303A and 303B. FIG. 3B is an exploded view of dynamically bendable automotive interior display system 300 of FIG. 3A. FIGS. 3A and 3B are discussed concurrently. Frame 302 can comprise first frame portion 304A, second frame portion 304B and hinge portion 306. Display electronics assembly 303A can comprise display screen 308A and support plate 310A. Display electronics assembly 303B can comprise display screen 308B and support plate 310B. Without being bound by theory, the system 300 may include a single display electronics assembly that includes a single or multiple support plates. As used herein, "display" includes a visual display with or without touch functionality, a touch panel, or a combination thereof. The display may be flat or curved, as defined herein with respect to the first and second panels (312A, 312B).

Cover substrate 301 can comprise first panel portion 312A, second panel portion 312B and flexible panel portion 314. In one or more embodiments, one or both of the first panel portion 312A and the second panel portion 312B may be flat or substantially flat (e.g., having a radius of curvature greater than 10,000 mm, greater than 15,000 mm or greater than 20,000 mm). In one or more embodiments, one or both the first panel portion 312A and the second panel portion 312B may be curved (e.g., having a radius of curvature less than or equal to 10,000 mm, less than or equal to 15,000 mm or less than or equal to 20,000 mm). In one or more embodiments, one or both the first panel portion 312A and the second panel portion 312B may be cold-formed and curved, hot-formed and curved or cold-formed and hot-formed and curved. Frame 302 can additionally include first cut-out 316A for first display electronics panel 306A and second cut-out 316B for second display electronics panel 306B. Frame 302 can extend from top edge 318 to bottom edge 320 and from left side 322 to right side 324, shown relative to the automotive interior of FIGS. 2A and 2B, for example.

Cover substrate 301 may include an inorganic material and may include an amorphous substrate, a crystalline substrate or a combination thereof. The cover substrate may be formed from man-made materials and/or naturally occurring materials (e.g., quartz and polymers). For example, in some instances, the cover substrate may be characterized as organic and may specifically be polymeric. Examples of suitable polymers include, without limitation: thermoplastics including polystyrene (PS) (including styrene copolymers and blends), polycarbonate (PC) (including copolymers and blends), polyesters (including copolymers and blends, including polyethyleneterephthalate and polyethyleneterephthalate copolymers), polyolefins (PO) and cyclicpolyolefins (cyclic-PO), polyvinylchloride (PVC), acrylic polymers including polymethyl methacrylate (PMMA) (including copolymers and blends), thermoplastic urethanes (TPU), polyetherimide (PEI) and blends of these polymers with each other. Other exemplary polymers include epoxy, styrenic, phenolic, melamine, and silicone resins.

In some specific embodiments, the cover substrate may specifically exclude polymeric, plastic and/or metal substrates. In one or more embodiments, the cover substrate may be combined with a polymeric, plastic or metal substrate to form a laminate. In one or more embodiments, the substrate exhibits a refractive index in the range from about 1.45 to about 1.55. In specific embodiments, the cover substrate may exhibit an average strain-to-failure at a surface on one or more opposing major surface that is 0.5% or greater, 0.6% or greater, 0.7% or greater, 0.8% or greater, 0.9% or greater, 1% or greater, 1.1% or greater, 1.2% or greater, 1.3% or greater, 1.4% or greater 1.5% or greater or even 2% or greater, as measured using ball-on-ring testing using at least 5, at least 10, at least 15, or at least 20 samples. In specific embodiments, the cover substrate may exhibit an average strain-to-failure at its surface on one or more opposing major surface of about 1.2%, about 1.4%, about 1.6%, about 1.8%, about 2.2%, about 2.4%, about 2.6%, about 2.8%, or about 3% or greater.

Suitable cover substrates may exhibit an elastic modulus (or Young's modulus) in the range from about 30 GPa to about 120 GPa. In some instances, the elastic modulus of the substrate may be in the range from about 30 GPa to about 110 GPa, from about 30 GPa to about 100 GPa, from about 30 GPa to about 90 GPa, from about 30 GPa to about 80 GPa, from about 30 GPa to about 70 GPa, from about 40 GPa to about 120 GPa, from about 50 GPa to about 120 GPa, from about 60 GPa to about 120 GPa, from about 70 GPa to about 120 GPa, and all ranges and sub-ranges therebetween.

In one or more embodiments, the cover substrates may include an amorphous substrate, which may include a glass substrate. The glass substrate may be strengthened or non-strengthened. Examples of suitable glass composition families used to form the glass articles include soda lime glass, alkali aluminosilicate glass, alkali containing borosilicate glass and alkali aluminoborosilicate glass. In one or more alternative embodiments, the cover substrate may include crystalline substrates such as glass ceramic substrate (which may be strengthened or non-strengthened) or may include a single crystal structure, such as sapphire. In one or more specific embodiments, the cover substrate includes an amorphous base (e.g., glass) and a crystalline cladding (e.g., sapphire layer, a polycrystalline alumina layer and/or or a spinel (MgA1204) layer).

The cover substrate may be substantially optically clear, transparent and free from light scattering. In such embodiments, the cover substrate may exhibit an average light transmission over the optical wavelength regime of about 85% or greater, about 86% or greater, about 87% or greater, about 88% or greater, about 89% or greater, about 90% or greater, about 91% or greater or about 92% or greater. In one or more alternative embodiments, the cover substrate may be opaque or exhibit an average light transmission over the optical wavelength regime of less than about 10%, less than about 9%, less than about 8%, less than about 7%, less than about 6%, less than about 5%, less than about 4%, less than about 3%, less than about 2%, less than about 1%, or less than about 0%. In some embodiments, these light transmittance values are total transmittance values (taking into account transmittance through both major surfaces of the substrate) The substrate 110 may optionally exhibit a color, such as white, black, red, blue, green, yellow, orange etc.

In one or more embodiments, the cover substrate has a thickness (t) that is about 2 mm or less or about 1.5 mm or less. In one or more embodiments, the thickness of the cover substrate is substantially uniform in that it the bend axis has substantially the same thickness as other portions of the cover substrate. For example, the thickness of the cover substrate does not vary by more than +10%, 5% or 2% across the total surface area of the first major surface, the second major surface or both the first and second major surfaces. In one or more embodiments, the thickness is substantially constant (within +1% of the average thickness) across 90%, 95% or 99% of the total surface area of the first major surface, the second major surface or both the first and second major surfaces.

In one or more embodiments, the cover substrate may be a glass substrate that is strengthened and exhibits a compressive stress (CS) region that extends from one or both major surfaces to a first depth of compression (DOC) measured from the major surface. The CS region includes a maximum CS magnitude ($CS_{max}$). The strengthened cover glass substrate has a CT region disposed in the central region that extends from the DOC to an opposing CS region. The CT region defines a maximum CT magnitude (CTmax). The CS region and the CT region define a stress profile that extends along the thickness of the cover glass substrate.

In one or more embodiments, the cover glass substrate may be strengthened mechanically by utilizing a mismatch of the coefficient of thermal expansion between portions of the substrate to create a compressive stress region and a central region exhibiting a tensile stress. In some embodiments, the cover glass substrate may be strengthened thermally by heating the glass to a temperature above the glass transition point and then rapidly quenching.

In one or more embodiments, the cover glass substrate may be chemically strengthening by ion exchange. In the ion exchange process, ions at or near the surface of the cover glass substrate are replaced by—or exchanged with—larger ions having the same valence or oxidation state. In those embodiments in which the cover glass substrate comprises an alkali-containing glass, ions in the surface layer of the article and the larger ions are monovalent alkali metal cations, such as Li+, Na+, K+, Rb+, and Cs+. Alternatively, monovalent cations in the surface layer may be replaced with monovalent cations other than alkali metal cations, such as Ag+ or the like. In such embodiments, the monovalent ions (or cations) exchanged into the cover glass substrate generate a stress.

In one or more embodiments, the cover glass substrate has a CSmax that is about 900 MPa or greater, about 920 MPa or greater, about 940 MPa or greater, about 950 MPa or greater, about 960 MPa or greater, about 980 MPa or greater, about 1000 MPa or greater, about 1020 MPa or greater, about 1040 MPa or greater, about 1050 MPa or greater, about 1060 MPa or greater, about 1080 MPa or greater, about 1100 MPa or greater, about 1120 MPa or greater, about 1140 MPa or greater, about 1150 MPa or greater, about 1160 MPa or greater, about 1180 MPa or greater, about 1200 MPa or greater, about 1220 MPa or greater, about 1240 MPa or greater, about 1250 MPa or greater, about 1260 MPa or greater, about 1280 MPa or greater, or about 1300 MPa or greater. In one or more embodiments, the CSmax is in a range from about 900 MPa to about 1500 MPa, from about 920 MPa to about 1500 MPa, from about 940 MPa to about 1500 MPa, from about 950 MPa to about 1500 MPa, from about 960 MPa to about 1500 MPa, from about 980 MPa to about 1500 MPa, from about 1000 MPa to about 1500 MPa, from about 1020 MPa to about 1500 MPa, from about 1040 MPa to about 1500 MPa, from about 1050 MPa to about 1500 MPa, from about 1060 MPa to about 1500 MPa, from about 1080 MPa to about 1500 MPa, from about 1100 MPa to about 1500 MPa, from about 1120 MPa to about 1500 MPa, from about 1140 MPa to about 1500 MPa, from about 1150 MPa to about 1500 MPa, from about 1160 MPa to about 1500 MPa, from about 1180 MPa to about 1500 MPa, from about 1200 MPa to about 1500 MPa, from about 1220 MPa to about 1500 MPa, from about 1240 MPa to about 1500 MPa, from about 1250 MPa to about 1500 MPa, from about 1260 MPa to about 1500 MPa, from about 1280 MPa to about 1500 MPa, from about 1300 MPa to about 1500 MPa, from about 900 MPa to about 1480 MPa, from about 900 MPa to about 1460 MPa, from about 900 MPa to about 1450 MPa, from about 900 MPa to about 1440 MPa, from about 900 MPa to about 1420 MPa, from about 900 MPa to about 1400 MPa, from about 900 MPa to about 1380 MPa, from about 900 MPa to about 1360 MPa, from about 900 MPa to about 1350 MPa, from about 900 MPa to about 1340 MPa, from about 900 MPa to about 1320 MPa, from about 900 MPa to about 1300 MPa, from about 900 MPa to about 1280 MPa, from about 900 MPa to about 1260 MPa, from about 900 MPa to about 1250 MPa, from about 900 MPa to about 1240 MPa, from about 900 MPa to about 1220 MPa, from about 900 MPa to about 1210 MPa, from about 900

MPa to about 1200 MPa, from about 900 MPa to about 1180 MPa, from about 900 MPa to about 1160 MPa, from about 900 MPa to about 1150 MPa, from about 900 MPa to about 1140 MPa, from about 900 MPa to about 1120 MPa, from about 900 MPa to about 1100 MPa, from about 900 MPa to about 1080 MPa, from about 900 MPa to about 1060 MPa, from about 900 MPa to about 1050 MPa, or from about 950 MPa to about 1050 MPa, or from about 1000 MPa to about 1050 MPa. CSmax may be measured at a major surface or may be found at a depth from the major surface within the CS region.

In one or more embodiments, the cover glass substrate has stress profile a CS magnitude of 800 MPa or greater at a depth within the glass substrate of about 10 micrometers from one or both side surfaces (CS10). In one or more embodiments, the CS10 is about 810 MPa or greater, about 820 MPa or greater, about 830 MPa or greater, about 840 MPa or greater, about 850 MPa or greater, about 860 MPa or greater, about 870 MPa or greater, about 880 MPa or greater, about 890 MPa or greater, or about 900 MPa or greater. In one or more embodiments, the CS10 is in a range from about 800 MPa to about 1000 MPa, from about 825 MPa to about 1000 MPa, from about 850 MPa to about 1000 MPa, from about 875 MPa to about 1000 MPa, from about 900 MPa to about 1000 MPa, from about 925 MPa to about 1000 MPa, from about 950 MPa to about 1000 MPa, from about 800 MPa to about 975 MPa, from about 800 MPa to about 950 MPa, from about 800 MPa to about 925 MPa, from about 800 MPa to about 900 MPa, from about 800 MPa to about 875 MPa, or from about 800 MPa to about 850 MPa.

In one or more embodiments, the glass substrate has a stress profile with a CS magnitude of 700 MPa or greater, or about 750 MPa or greater at a depth within the glass substrate from one or both side surfaces of about 5 micrometers from the first major surface 102 (CS5). In one or more embodiments, the CS5 is about 760 MPa or greater, about 770 MPa or greater, about 775 MPa or greater, about 780 MPa or greater, about 790 MPa or greater, about 800 MPa or greater, about 810 MPa or greater, about 820 MPa or greater, about 825 MPa or greater, or about 830 MPa or greater. In one or more embodiments, the CS5 is in a range from about 700 MPa to about 900 MPa, from about 725 MPa to about 900 MPa, from about 750 MPa to about 900 MPa, from about 775 MPa to about 900 MPa, from about 800 MPa to about 900 MPa, from about 825 MPa to about 900 MPa, from about 850 MPa to about 900 MPa, from about 700 MPa to about 875 MPa, from about 700 MPa to about 850 MPa, from about 700 MPa to about 825 MPa, from about 700 MPa to about 800 MPa, from about 700 MPa to about 775 MPa, from about 750 to about 800 MPa, from about 750 MPa to about 850 MPa, or from about 700 MPa to about 750 MPa.

In one or more embodiments, the CTmax magnitude is about 80 MPa or less, about 78 MPa or less, about 76 MPa or less, about 75 MPa or less, about 74 MPa or less, about 72 MPa or less, about 70 MPa or less, about 68 MPa or less, about 66 MPa or less, about 65 MPa or less, about 64 MPa or less, about 62 MPa or less, about 60 MPa or less, about 58 MPa or less, about 56 MPa or less, about 55 MPa or less, about 54 MPa or less, about 52 MPa or less, or about 50 MPa or less. In one or more embodiments, the CTmax magnitude is in a range from about 40 MPa to about 80 MPa, from about 45 MPa to about 80 MPa, from about 50 MPa to about 80 MPa, from about 55 MPa to about 80 MPa, from about 60 MPa to about 80 MPa, from about 65 MPa to about 80 MPa, from about 70 MPa to about 80 MPa, from about 40 MPa to about 75 MPa, from about 40 MPa to about 70 MPa, from about 40 MPa to about 65 MPa, from about 40 MPa to about 60 MPa, from about 40 MPa to about 55 MPa, or from about 40 MPa to about 50 MPa.

In one or more embodiments, the DOC of the cover glass substrate is about 0.2*thickness of the glass substrate (0.2*t) or less. For example, DOC may be about 0.18 t or less, about 0.18 t or less, about 0.16 t or less, about 0.15 t or less, about 0.14 t or less, about 0.12 t or less, about 0. It or less, about 0.08 t or less, about 0.06 t or less, about 0.05 t or less, about 0.04 t or less, or about 0.03 t or less. In one or more embodiments, DOC is in a range from about 0.02 t to about 0.2 t, from about 0.04 t to about 0.2 t, from about 0.05 t to about 0.2 t, from about 0.06 t to about 0.2 t, from about 0.08 t to about 0.2 t, from about 0. It to about 0.2 t, from about 0.12 t to about 0.2 t, from about 0.14 t to about 0.2 t, from about 0.15 t to about 0.2 t, from about 0.16 t to about 0.2 t, from about 0.02 t to about 0.18 t, from about 0.02 t to about 0.16 t, from about 0.02 t to about 0.15 t, from about 0.02 t to about 0.14 t, from about 0.02 t to about 0.12 t, from about 0.02 t to about 0. It, from about 0.02 t to about 0.08, from about 0.02 t to about 0.06 t, from about 0.02 t to about 0.05 t, from about 0. It to about 0.8 t, from about 0.12 t to about 0.16 t, or from about 0.14 t to about 0.17 t.

In one or more embodiments, the cover glass substrate may be unstrengthened. In some embodiments, the unstrengthened glass comprises an annealed glass.

Exemplary compositions for such glass substrate may include a soda-lime silicate glass composition, an aluminosilicate glass composition, or an alkali aluminosilicate glass composition.

The cover glass substrate may have a thickness in a range from about 0.1 mm to about 6 mm or that is in a range from about 0.1 mm to about 1.5 mm. For example, the cover glass substrate may have a thickness that is greater than about 0.125 mm (e.g., about 0.13 mm or greater, about 0.13 mm or greater, about 0.13 mm or greater, about 0.13 mm or greater, about 0.13 mm or greater, about 0.13 mm or greater, about 0.13 mm or greater, about 0.13 mm or greater, about 0.13 mm or greater, about 0.13 mm or greater, about 0.13 mm or greater, about 0.13 mm or greater, about 0.13 mm or greater, about 0.13 mm or greater, about 0.13 mm or greater). In one or more embodiments, the cover glass substrate thickness may be in a range from about 0.01 mm to about 1.5 mm, 0.02 mm to about 1.5 mm, 0.03 mm to about 1.5 mm, 0.04 mm to about 1.5 mm, 0.05 mm to about 1.5 mm, 0.06 mm to about 1.5 mm, 0.07 mm to about 1.5 mm, 0.08 mm to about 1.5 mm, 0.09 mm to about 1.5 mm, 0.1 mm to about 1.5 mm, from about 0.15 mm to about 1.5 mm, from about 0.2 mm to about 1.5 mm, from about 0.25 mm to about 1.5 mm, from about 0.3 mm to about 1.5 mm, from about 0.35 mm to about 1.5 mm, from about 0.4 mm to about 1.5 mm, from about 0.45 mm to about 1.5 mm, from about 0.5 mm to about 1.5 mm, from about 0.55 mm to about 1.5 mm, from about 0.6 mm to about 1.5 mm, from about 0.65 mm to about 1.5 mm, from about 0.7 mm to about 1.5 mm, from about 0.01 mm to about 1.4 mm, from about 0.01 mm to about 1.3 mm, from about 0.01 mm to about 1.2 mm, from about 0.01 mm to about 1.1 mm, from about 0.01 mm to about 1.05 mm, from about 0.01 mm to about 1 mm, from about 0.01 mm to about 0.95 mm, from about 0.01 mm to about 0.9 mm, from about 0.01 mm to about 0.85 mm, from about 0.01 mm to about 0.8 mm, from about 0.01 mm to about 0.75 mm, from about 0.01 mm to about 0.7 mm, from about 0.01 mm to about 0.65 mm, from about 0.01 mm to about 0.6 mm, from about 0.01 mm to about 0.55 mm, from about 0.01 mm to about 0.5 mm, from about 0.01 mm to about 0.4 mm, from about 0.01 mm to about 0.3 mm, from about 0.01 mm to about 0.2 mm, from about 0.01 mm to about 0.1 mm, from about 0.04 mm to about 0.07 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1.05 mm, from about 0.1 mm to about 1 mm, from about 0.1 mm to about 0.95 mm, from about 0.1 mm to about 0.9 mm, from about 0.1 mm to about 0.85 mm, from about 0.1 mm to about 0.8 mm, from about 0.1 mm to about 0.75 mm, from about 0.1 mm to about 0.7 mm, from about 0.1 mm to about 0.65 mm, from about 0.1 mm to about 0.6 mm, from about 0.1 mm to about 0.55 mm, from about 0.1 mm to about 0.5 mm, from about 0.1 mm to about 0.4 mm, or from about 0.3 mm to about 0.7 mm.

In one or more embodiments, the cover glass substrate has a width in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm.

In one or more embodiments, the cover glass substrate has a length in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm.

In some embodiments, the cover glass substrate may be or include a relatively thin steel laminate or other thin laminate product. The substrate may additionally or alternatively be coated, decorated, or otherwise pre-treated. In one or more embodiments, the either one of or both the opposing major surfaces of the cover glass substrate includes a surface treatment. The surface treatment may cover at least a portion of one or both major surfaces. Exemplary surface treatments include an easy-to-clean surface, an anti-glare surface, an anti-reflective surface, a haptic surface, and a decorative surface. In one or more embodiments, at least a portion of the major surfaces may include any one, any two or all three of an anti-glare surface, an anti-reflective surface, a haptic surface, and a decorative surface. For example, one major surface may include an anti-glare surface and the other opposing major surface may include an anti-reflective surface. In another example, one major surface comprises either one of or both the anti-glare surface and the anti-reflective surface, and the other major surface includes the decorative surface.

The anti-glare surface may be formed using an etching process and may exhibit a transmission haze 20% or less (e.g., about 15% or less, or about 10% or less), and a distinctiveness of image (DOI) of about 80 or less. As used herein, the terms "transmission haze" and "haze" refer to the percentage of transmitted light scattered outside an angular cone of about +2.5° in accordance with ASTM procedure D1003. For an optically smooth surface, transmission haze is generally near zero. As used herein, the term "distinctness of image" is defined by method A of ASTM procedure D5767 (ASTM 5767), entitled "Standard Test Methods for Instrumental Measurements of Distinctness-of-Image Gloss of Coating Surfaces," the contents of which are incorporated herein by reference in their entirety. In accordance with method A of ASTM 5767, substrate reflectance factor measurements are made on the anti-glare surface at the specular viewing angle and at an angle slightly off the specular viewing angle. The values obtained from these measurements are combined to provide a DOI value. In particular, DOI is calculated according to the equation $$DOI = \left[1 - \frac{Ros}{Rs}\right] \times 100, \tag{1}$$

where Ros is the relative reflection intensity average between 0.2° and 0.4 away from the specular reflection direction, and Rs is the relative reflection intensity average in the specular direction (between +0.05° and −0.05°, centered around the specular reflection direction). If the input light source angle is +20° from the sample surface normal (as it is throughout this disclosure), and the surface normal to the sample is taken as 0°, then the measurement of specular reflected light Rs is taken as an average in the range of about −19.95° to −20.05°, and Ros is taken as the average reflected intensity in the range of about −20.2° to −20.4° (or from −19.6° to −19.8°, or an average of both of these two ranges). As used herein, DOI values should be directly interpreted as specifying a target ratio of Ros/Rs as defined herein. In some embodiments, the anti-glare surface has a reflected scattering profile such that >95% of the reflected optical power is contained within a cone of +/−10°, where the cone is centered around the specular reflection direction for any input angle.

The resulting the anti-glare surface may include a textured surface with plurality of concave features having an opening facing outwardly from the surface. The opening may have an average cross-sectional dimension of about 30 micrometers or less. In one or more embodiments, the anti-glare surface exhibits low sparkle (in terms of low pixel power deviation reference or PPDr) such as PPDr of about 6% or less, As used herein, the terms "pixel power deviation referenced" and "PPDr" refer to the quantitative measurement for display sparkle. Unless otherwise specified, PPDr is measured using a display arrangement that includes an edge-lit liquid crystal display screen (twisted nematic liquid crystal display) having a native sub-pixel pitch of 60 μm×180 μm and a sub-pixel opening window size of about 44 μm×about 142 μm. The front surface of the liquid crystal display screen had a glossy, anti-reflection type linear polarizer film. To determine PPDr of a display system or an anti-glare surface that forms a portion of a display system, a screen is placed in the focal region of an "eye-simulator" camera, which approximates the parameters of the eye of a human observer. As such, the camera system includes an aperture (or "pupil aperture") that is inserted into the optical path to adjust the collection angle of light, and thus approximate the aperture of the pupil of the human eye. In the PPDr measurements described herein, the iris diaphragm subtends an angle of 18 milliradians.

The anti-reflective surface may be formed by a multi-layer coating stack formed from alternating layers of a high refractive index material and a low refractive index material. Such coatings stacks may include 6 layers or more. In one or more embodiment, the anti-reflective surface may exhibit a single-side average light reflectance of about 2% or less (e.g., about 1.5% or less, about 1% or less, about 0.75% or less, about 0.5% or less, or about 0.25% or less) over the optical wavelength regime in the range from about 400 nm to about 800 nm. The average reflectance is measured at an incident illumination angle greater than about 0 degrees to less than about 10 degrees.

The decorative surface may include any aesthetic design formed from a pigment (e.g., ink, paint and the like) and can include a wood-grain design, a brushed metal design, a graphic design, a portrait, or a logo. In one or more embodiments, the decorative surface exhibits a deadfront effect in which the decorative surface disguises or masks the underlying display from a viewer when the display is turned off but permits the display to be viewed when the display is turned on. The decorative surface may be printed onto the cover glass substrate. In one or more embodiments, the anti-glare surface includes an etched surface. In one or more embodiments, the anti-reflective surface includes a multi-layer coating. In one or more embodiments, the easy-to-clean surface includes an oleophobic coating that imparts anti-fingerprint properties. In one or more embodiments, the haptic surface includes a raised or recessed surface formed from depositing a polymer or glass material on the surface to provide a user with tactile feedback when touched.

In one or more embodiments, the surface treatment (i.e., the easy-to-clean surface, the anti-glare surface, the anti-reflective surface, the haptic surface and/or the decorative surface) is disposed on at least a portion of the periphery of a major surface and the interior portion of the major surface is substantially free of the surface treatment.

In view of the foregoing properties, cover substrate 301 can be configured to be bent. Frame 302 supports cover substrate 301 to induce bending at flexible panel portion 314. Hinge portion 306 can be constructed according to the present application to induce a continuous curvature, such as a single radius of curvature, in flexible panel portion 314 that presents a smooth, aesthetically pleasing appearance. Note, FIGS. 3A and 3B show hinge portion 306 comprising a pinned hinge configuration similar to the embodiment of FIGS. 12A and 12B. However, any of the frame structures described with reference to FIGS. 4A-15 can be used in display system 300. Furthermore, the various frames and cover substrates described herein with reference to FIGS. 4A-15 can be used in any of the displays or panels described herein, such as display 22, display 28, display 36 and display system 100. Frame 302 and any of the frames described herein, including frames 400, 500, 600, 700, 800, 900, 1000, 1100, 1200, 1300 and 1400, can be made of suitably strong materials to provide support and to meet HIT requirements, such as steel, aluminum, plastic and the like.

Figure 4A:
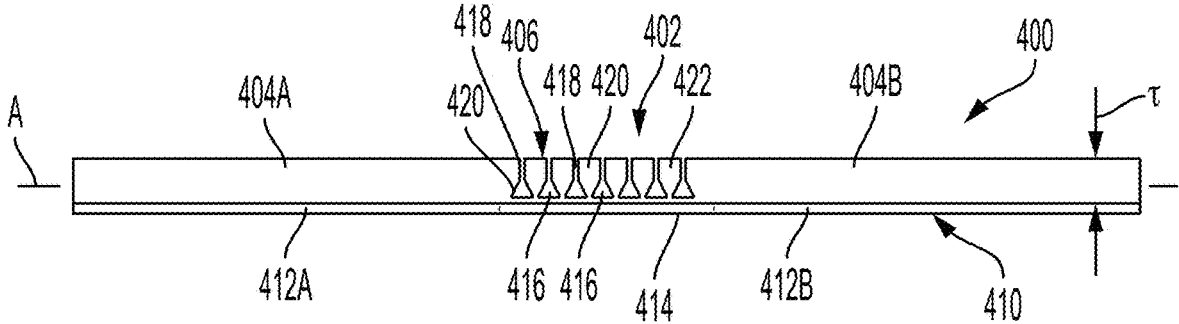
FIGS. 4A and 4B are side schematic views of a cover substrate attached to a frame having a first embodiment of a living hinge comprising geometric relief cuts in straight and bent configurations, respectively.
Figure 4B:
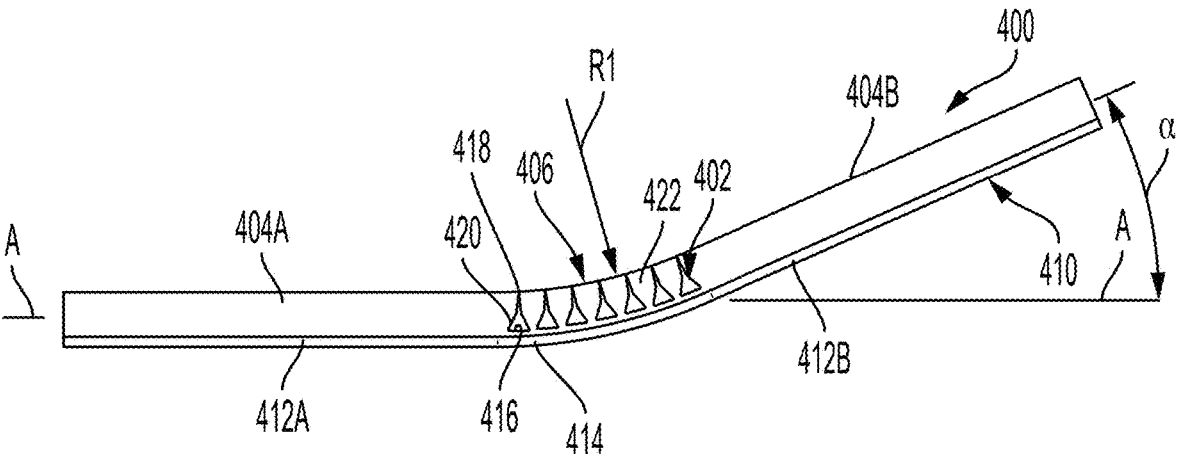

FIGS. 4A and 4B are side schematic views of frame 400 having a first embodiment of a living hinge comprising geometric relief cuts 402 in straight and bent configurations, respectively. Frame 400 can comprise first frame portion 404A, second frame portion 404B and hinge portion 406. Frame 400 can be attached to cover substrate 410. Cover substrate 410 can comprise first panel portion 412A, second panel portion 412B and flexible panel portion 414. In one or more embodiments, one or both of the first panel portion 412A and the second panel portion 412B may be flat or substantially flat (e.g., having a radius of curvature greater than 10,000 mm, greater than 15,000 mm or greater than 20,000 mm). In one or more embodiments, one or both the first panel portion 412A and the second panel portion 412B may be curved (e.g., having a radius of curvature less than or equal to 10,000 mm, less than or equal to 15,000 mm or less than or equal to 20,000 mm). In one or more embodiments, one or both the first panel portion 412A and the second panel portion 412B may be cold-formed and curved, hot-formed and curved or cold-formed and hot-formed and curved.

Geometric relief cuts 402 can comprise longitudinal slots comprising flat troughs 416, abutment surfaces 418 and connecting surfaces 420. Geometric relief cuts 402 can extend across frame 400 into the plane of FIGS. 4A and 4B from top edge 318 (FIG. 3B) to bottom edge 320 (FIG. 3B), perpendicular to axis A. Geometric relief cuts 402 can result in frame 400 having a plurality of pedestals 422 that extend lengthwise (top-to-bottom) across cover substrate 410 to provide support to flexible panel portion 414.

Geometric relief cuts 402 comprise a weakening of frame 400 adjacent flexible panel portion 414. The weakening allows flexible panel portion 414 to more readily bend along a predetermined radiused curvature such that second frame portion 404B can be articulated at angle α relative to first frame portion 404A. In examples, angle α can be in the range of approximately twenty degrees to approximately ninety degrees. As can be seen in FIGS. 4A and 4B, geometric relief cuts 402 remove material from thickness t of frame 400 perpendicular to axis A. In examples, thickness t can be reduced in the range of about fifty percent to about ninety-seven percent. In an example, thickness t is reduced from 10 mm to 0.29 mm. However, thickness t of troughs 416 as well as the presence of pedestals 422, provide cover substrate 410 with enough support to prevent shattering and satisfy HIT requirements.

In the straight or extended configuration of FIG. 4A, troughs 416 are flat and extend parallel to the front surface of panel portions 412A-412C along axis A, and abutment surfaces 418 extend perpendicular to the front surface of panel portions 412A-412C. Troughs 416 can be flat to facilitate even bending. Troughs 416 can have other shapes, such as concave or convex. However, the present inventors have found flat troughs 416 to be effective at producing a constant radius of curvature R1 between frame portions 404A and 404B, while also avoiding the generation of stress concentrations that can occur with other shapes. As frame 400 moves from the straight position to a deployed position where second frame portion 404B is positioned at angle α relative to first frame portion 404A, troughs 416 can become curved.

Abutment surfaces 418 can be flat to provide large contact areas for distributing bending forces. Though in other examples, abutment surfaces 418 need not be flat. Likewise, abutment surfaces 418 need not be perpendicular to axis A, such as flat or curved. Connecting surfaces 420 can have any shape. Flat connecting surfaces 420 are conducive to manufacturing.

When second frame portion 404B is pushed to the fully retraced position shown in FIG. 4B, pedestals 422 contact each other to provided rigidity to frame 400 for the support of cover substrate 410, while the thinned portions forming troughs 416 between pedestals 422 allow for easy flexure of flexible panel portion 414.

Instead of producing a constant radius of curvature R1 along hinge portion 406, relief cuts 402 can be configured to produce other curvatures, such as parabolic, by varying the thickness of troughs 416. For example, troughs 416 near the center of hinge portion 406 could be thicker or thinner than troughs 416 near frame portions 404A and 404B, with a gradient of trough heights being produced therebetween.

Figure 5A:
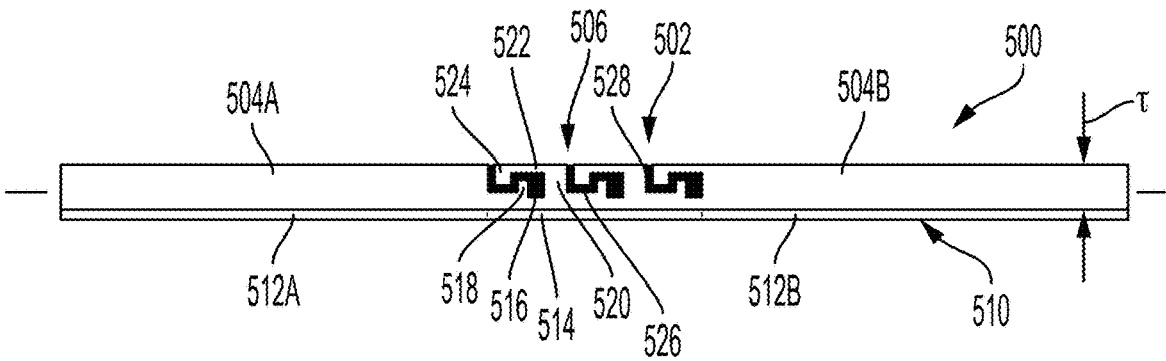
FIGS. 5A and 5B are side schematic views of a cover substrate attached to a frame having a second embodiment of a living hinge comprising a double-locking features in straight and bent configurations, respectively.
Figure 5B:
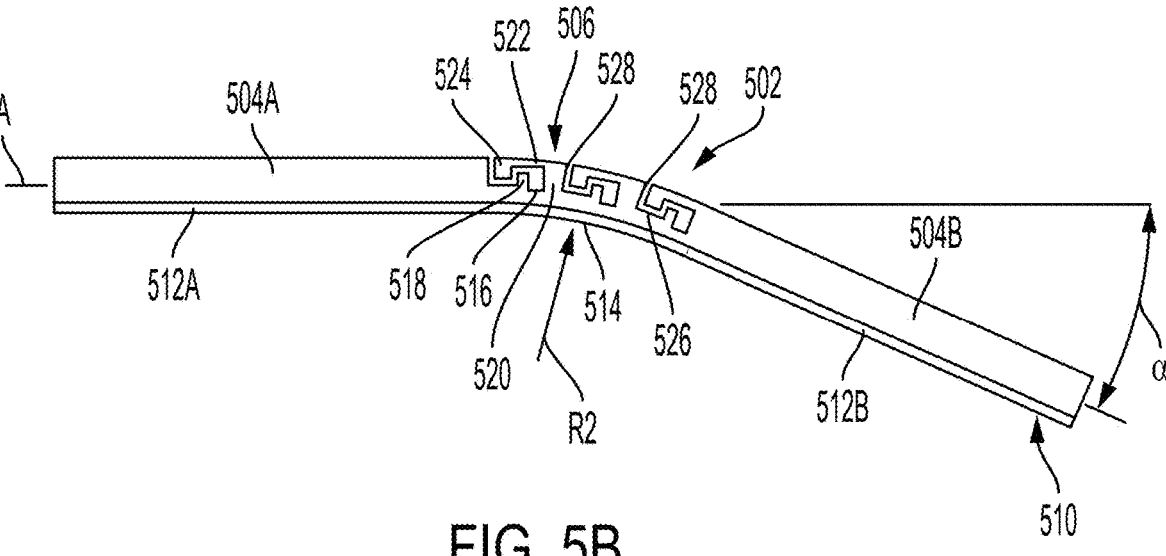

FIGS. 5A and 5B are side schematic views of cover substrate 500 having a second embodiment of a living hinge comprising double-locking features 502 in straight and bent configurations, respectively.

Frame 500 can comprise first frame portion 504A, second frame portion 504B and hinge portion 506. Frame 500 can be attached to cover substrate 510. Cover substrate 510 can comprise first panel portion 512A, second panel portion 512B and flexible panel portion 514. In one or more embodiments, one or both of the first panel portion 512A and the second panel portion 512B may be flat or substantially flat (e.g., having a radius of curvature greater than 10,000 mm, greater than 15,000 mm or greater than 20,000 mm). In one or more embodiments, one or both the first panel portion 512A and the second panel portion 512B may be curved (e.g., having a radius of curvature less than or equal to 10,000 mm, less than or equal to 15,000 mm or less than or equal to 20,000 mm). In one or more embodiments, one or both the first panel portion 512A and the second panel portion 512B may be cold-formed and curved, hot-formed and curved or cold-formed and hot-formed and curved.

Double-locking features 502 can comprise geometric relief cuts similar to geometric relief cuts 402 of FIGS. 4A and 4B. However, double-locking features 502 can inhibit both backward deflection of second frame portion 504B (similar to what is shown in FIGS. 4A and 4B, e.g., positive α) and forward deflection of second frame portion 504B, as is shown in FIG. 5B (e.g., negative α).

Double-locking features 502 can comprise longitudinal slots comprising first troughs 516, first projections 518, second projections 520, cross members 522, tabs 524 and second troughs 526. Projections 518 and 520 of double-locking features 502 can result in frame 500 having a plurality of ribs that extend lengthwise (top-to-bottom) across cover substrate 510 to provide support to flexible panel portion 514.

Double-locking features 502 can extend across frame 500 into the plane of FIGS. 5A and 5B from top edge 318 (FIG. 3B) to bottom edge 320 (FIG. 3B), perpendicular to axis A. Double-locking features 502 comprise a weakening of frame 500 adjacent flexible panel portion 514. The weakening allows flexible panel portion 514 to more readily bend along a predetermined radiused curvature such that second frame portion 504B can be articulated at angle-α relative to first frame portion 504A. As can be seen in FIGS. 5A and 5B, geometric relief cuts 502 remove material from thickness t of frame 500 perpendicular to axis A. In examples, thickness t can be reduced in the range of about fifty percent to about ninety-seven percent. In an example, thickness t is reduced from 10 mm to 0.29 mm. However, thickness t of troughs 516 and 526 as well as the presence of projections 518 and 520, provide cover substrate 510 with enough support to prevent shattering and satisfy HIT requirements.

In the straight or extended configuration of FIG. 5A, troughs 516 and 526 are flat and extend parallel to the front surface of panel portions 512A-512C along axis A, and projections 518 and 520 extend perpendicular to the front surface of panel portions 512A-512C. Troughs 516 and 526 can be flat to facilitate even bending. Troughs 516 and 526 can have other shapes, such as concave or convex. However, the present inventors have found flat troughs 516 and 526 to be effective at producing a constant radius of curvature R2 between frame portions 504A and 504B, while also avoiding the generation of stress concentrations that can occur with other shapes. As frame 500 moves from the straight position to a deployed position where second frame portion 504B is positioned at angle-α relative to first frame portion 504A, troughs 516 and 526 can become curved.

Projections 518 and 520 can have rectilinear cross-sections such that opposing faces of adjacent one of projections 518 and 520 are flat. As second frame portion 504B is moved forward in FIG. 5B, tabs 524 are moved into engagement with projections 518, thereby limiting the amount that second frame portion 504B can be moved. As second frame portion 504B is moved backward in the opposite direction of that of FIG. 5B (e.g., in the positive α direction), tabs 524 are moved into engagement with walls 528, thereby limiting the amount that second frame portion 504B can be moved.

Instead of producing a constant radius of curvature R2 along hinge portion 506, double-locking features 502 can be configured to produce other curvatures, such as parabolic, by varying the thickness of troughs 516. For example, troughs 516 near the center of hinge portion 506 could be thicker or thinner than troughs 516 near frame portions 504A and 504B, with a gradient of trough heights being produced therebetween.

FIGS. 6A and 6B are side schematic views of frame 600 having a third embodiment of a living hinge comprising patterned relief cuts 602 in straight and bent configurations, respectively.

Frame 600 can comprise first frame portion 604A, second frame portion 604B and hinge portion 606. Frame 600 can be attached to cover substrate 610. Cover substrate 610 can comprise first panel portion 612A, second panel portion 612B and flexible panel portion 614. In one or more embodiments, one or both of the first panel portion 612A and the second panel portion 612B may be flat or substantially flat (e.g., having a radius of curvature greater than 10,000 mm, greater than 15,000 mm or greater than 20,000 mm). In one or more embodiments, one or both the first panel portion 612A and the second panel portion 612B may be curved (e.g., having a radius of curvature less than or equal to 10,000 mm, less than or equal to 15,000 mm or less than or equal to 20,000 mm). In one or more embodiments, one or both the first panel portion 612A and the second panel portion 612B may be cold-formed and curved, hot-formed and curved or cold-formed and hot-formed and curved.

Patterned relief cuts 602 can comprise rows and columns of first relief cuts 616A and second relief cuts 616B. In the illustrated example, first relief cuts 616A can be arranged in four columns and two rows, and second relief cuts 616B can be arranged in four columns and one row. Though, in other examples, any number of rows and columns can be used The columns of relief cuts 616B can be interspersed with the columns of relief cuts 616A. The rows of relief cuts 616B can be offset from the rows of relief cuts 616A. Such patterning of relief cuts 616A and 616B can ensure that, except for the edges of frame 600 at top edge 318 (FIG. 3B) and bottom edge 320 (FIG. 3B), there is no path from first frame portion 604A to second frame portion 604B that is not interrupted by relief cuts 616A and 616B in hinge portion 606.

Relief cuts 616A and 616B weaken frame 600 adjacent flexible panel portion 614 to facilitate flexing of the material of frame 600 about a constant radius of curvature R3. Whereas without relief cuts 616A and 616B, the material of frame 600 would tend to stretch, particularly at thicknesses desirable to address HIT requirements, thereby potentially resulting in uneven curvature in cover substrate 610.

Relief cuts 616A and 616B can comprise slots that are elongated in the direction of top edge 318 (FIG. 3A) to bottom edge 320 (FIG. 3B) such that the slots extend transverse to axis A and parallel to bend axis BA (FIGS. 2A and 2B). Relief cuts 616A and 616B can have semi-circular end portions with straight side portions. However, relief cuts 616A and 616B can have other shapes, such as rectangular, oval, circular and square.

Instead of producing a constant radius of curvature R3 along hinge portion 606, patterned relief cuts 602 can be configured to produce other curvatures, such as parabolic, by varying the length and width of relief cuts 616. For example, relief cuts 616 near the center of hinge portion 606 could be thicker or thinner than relief cuts 616A and 616B near frame portions 604A and 604B, with a gradient of trough heights being produced therebetween.

Figure 7A:
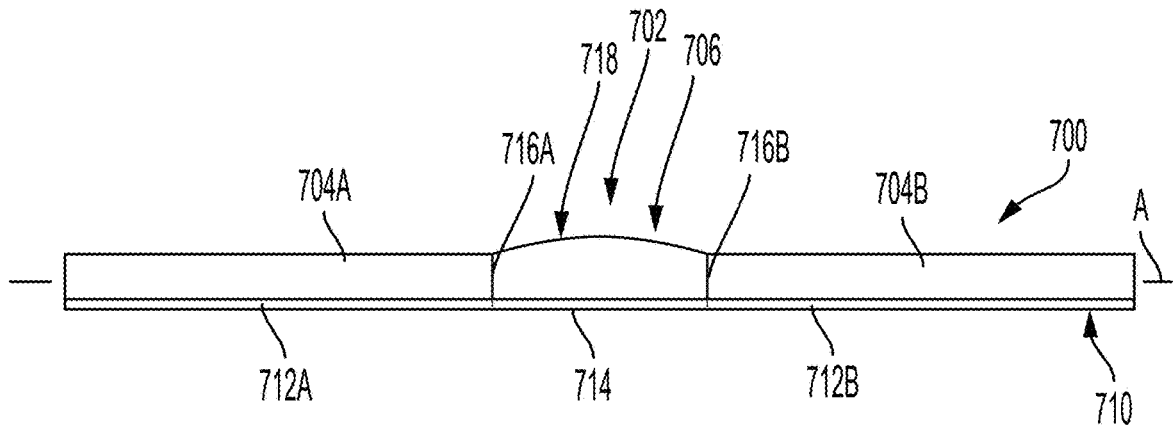
FIGS. 7A and 7B are side schematic views of a cover substrate attached to a frame having a fourth embodiment of a living hinge comprising a variable thickness bending region in straight and bent configurations, respectively.
Figure 7B:
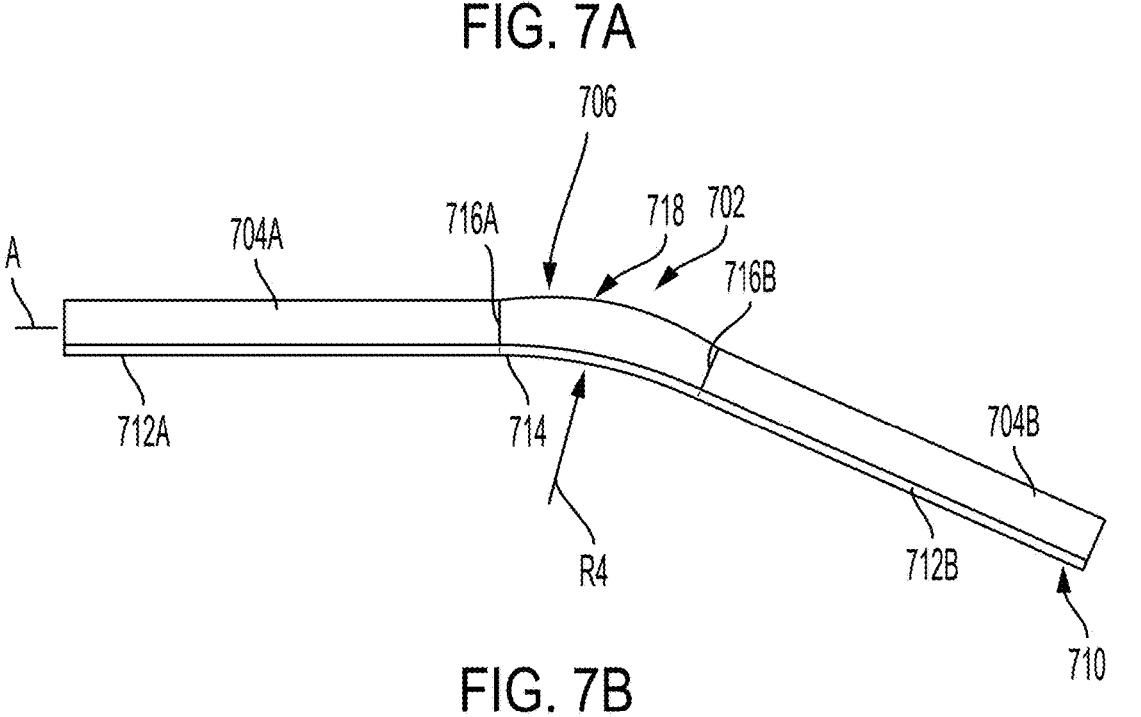
Figure 8A:
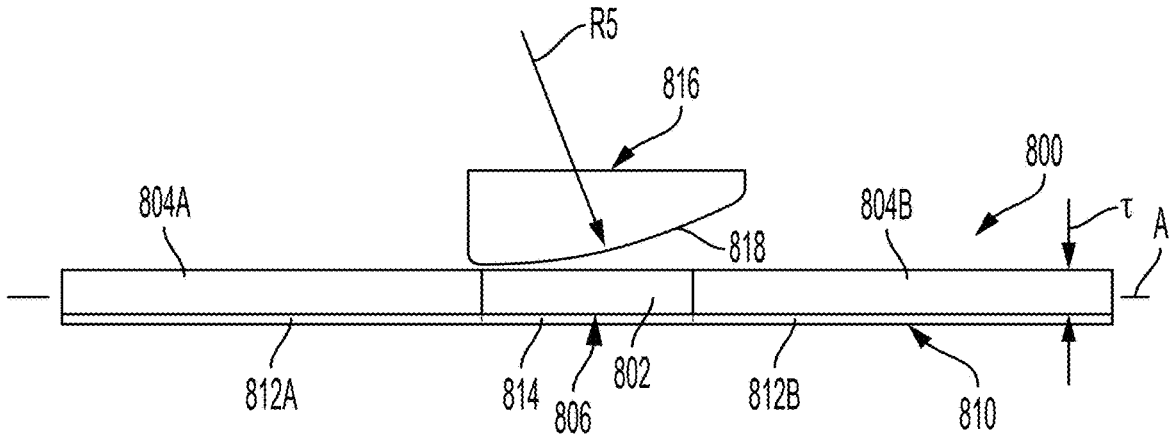
FIGS. 8A and 8B are side schematic views of a cover substrate attached to a frame having a fifth embodiment of a living hinge comprising a flexure mandrel in straight and bent configurations, respectively.
Figure 8B:
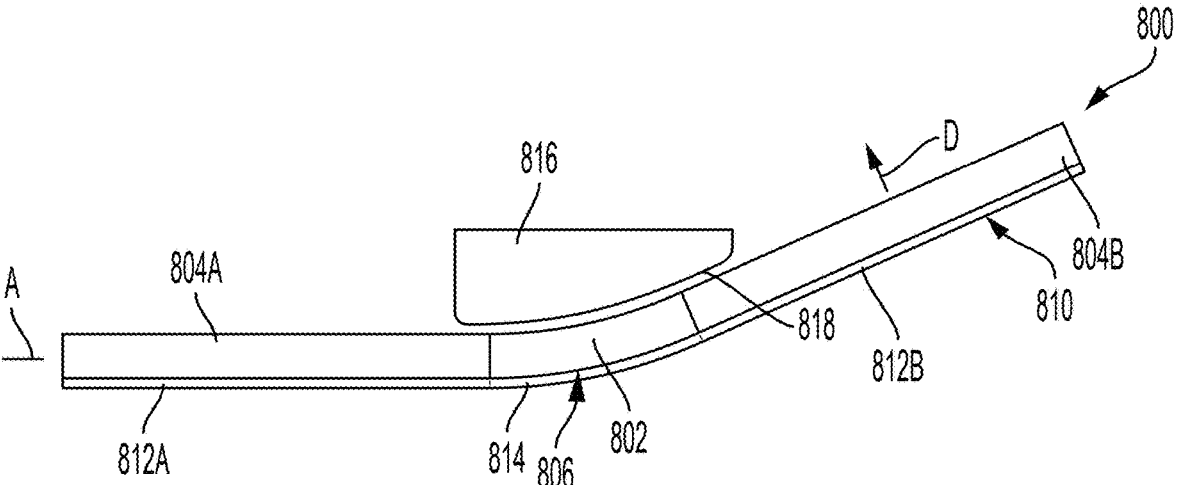

FIGS. 7A and 7B are side schematic views of frame 700 having a fourth embodiment of a living hinge comprising variable thickness bending region 702 in straight and bent configurations, respectively.

Frame 700 can comprise first frame portion 704A, second frame portion 704B and hinge portion 706. Frame 700 can be attached to cover substrate 710. Cover substrate 710 can comprise first panel portion 712A, second panel portion 712B and flexible panel portion 714. In one or more embodiments, one or both of the first panel portion 712A and the second panel portion 712B may be flat or substantially flat (e.g., having a radius of curvature greater than 10,000 mm, greater than 15,000 mm or greater than 20,000 mm). In one or more embodiments, one or both the first panel portion 712A and the second panel portion 712B may be curved (e.g., having a radius of curvature less than or equal to 10,000 mm, less than or equal to 15,000 mm or less than or equal to 20,000 mm). In one or more embodiments, one or both the first panel portion 712A and the second panel portion 712B may be cold-formed and curved, hot-formed and curved or cold-formed and hot-formed and curved.

Variable thickness bending region 702 can comprise first end 716A, middle portion 718 and second end 716B. Middle portion 718 can be thicker than first end 716A and second end 716B. First end 716A and second end 716B can have the same thickness as first panel portion 712A and second panel portion 712B. Middle portion 718 can be thicker such that middle portion is stiffer than portions of variable thickness bending region 712 proximate ends 716A and 716B. Variable thickness bending region 702 can taper from middle portion 718 to ends 716A and 716B. In the illustrated example, variable thickness bending region 702 is curved from middle portion 718 out to ends 716A and 716B. However, in other examples variable thickness bending region 702 can have two portions that are connected at a peak or apex at the center of bending region 702 located at the center of flexible panel portion 714. Variable thickness bending region 702 can provide full coverage and support to flexible panel portion 714.

Variable thickness bending region 702 can comprise a body of material that is different from the material of first frame portion 704A and second frame portion 704B. In examples, variable thickness bending region 702 can be comprised of a softer material than frame portions 704A and 704B, such as rubber, plastic or an elastomer. Variable thickness bending region 702 can be bonded to frame portions 704A and 704B, such as with an adhesive, glue or epoxy.

The variable thickness of variable thickness bending region 702, e.g., being thicker and stiffer in the middle and thinner and less stiff towards ends 716A and 716B, can facilitate stretching and bending of variable thickness bending region about constant radius of curvature R4. In additional examples, variable thickness bending region 702 can include patterned relief cuts, such as patterned relief cuts 602 of FIGS. 6A and 6B, to further facilitate radiused bending.

Instead of producing a constant radius of curvature R4 along hinge portion 706, bending region 702 can be configured to produce other curvatures, such as parabolic, by varying the thickness of middle portion 718 relative to end portions 716A and 716B. For example, end portions 716A and 716B could be made thicker to be closer to the thickness of middle portion 718, with variable gradients being used therebetween to control the bending to other curvatures than circular, such as parabolic.

FIGS. t and 8B are side schematic views of frame 800 having a fifth embodiment of a living hinge comprising flexure mandrel portion 802 in straight and bent configurations, respectively.

Frame 800 can comprise first frame portion 804A, second frame portion 804B and hinge portion 806. Frame 800 can be attached to cover substrate 810. Cover substrate 810 can comprise first panel portion 812A, second panel portion 812B and flexible panel portion 814. In one or more embodiments, one or both of the first panel portion 812A and the second panel portion 812B may be flat or substantially flat (e.g., having a radius of curvature greater than 10,000 mm, greater than 15,000 mm or greater than 20,000 mm). In one or more embodiments, one or both the first panel portion 812A and the second panel portion 812B may be curved (e.g., having a radius of curvature less than or equal to 10,000 mm, less than or equal to 15,000 mm or less than or equal to 20,000 mm). In one or more embodiments, one or both the first panel portion 812A and the second panel portion 812B may be cold-formed and curved, hot-formed and curved or cold-formed and hot-formed and curved. Mandrel 816 can be positioned behind flexure mandrel portion 802.

Flexure mandrel portion 802 can comprise a body of material that is different from the material of first frame portion 804A and second frame portion 804B. In examples, flexure mandrel portion 802 can be comprised of a softer material than frame portions 804A and 804B, such as rubber, plastic or an elastomer. Flexure mandrel portion 802 can be bonded to frame portions 804A and 804B, such as with an adhesive, glue or epoxy. Flexure mandrel portion 802 can have the same thickness t as first and second frame portions 804A and 804B.

Mandrel 816 can have bend face 818 that can be shaped to have radius of curvature R. Thus, as second panel portion 804B is pushed backward from axis A in direction D, flexure mandrel portion 802 can be pushed against bend face 818 to induce a controlled bending of flexible panel portion 814. Bend face 818 can have an arc length that is longer than flexure mandrel portion 802 such that small segments of first frame portion 804A and second frame portion 804B can be supported against mandrel 816, thereby ensuring continuity of the curvature of flexure mandrel portion 802 between frame portions 804A and 804B and that no discontinuities will be formed in flexible panel portion 814.

Instead of producing a constant radius of curvature R5 along hinge portion 806, mandrel 816 can be curved along other curvatures, such as parabolic, to produce other curvatures in hinge portion 806.

Figure 9A:
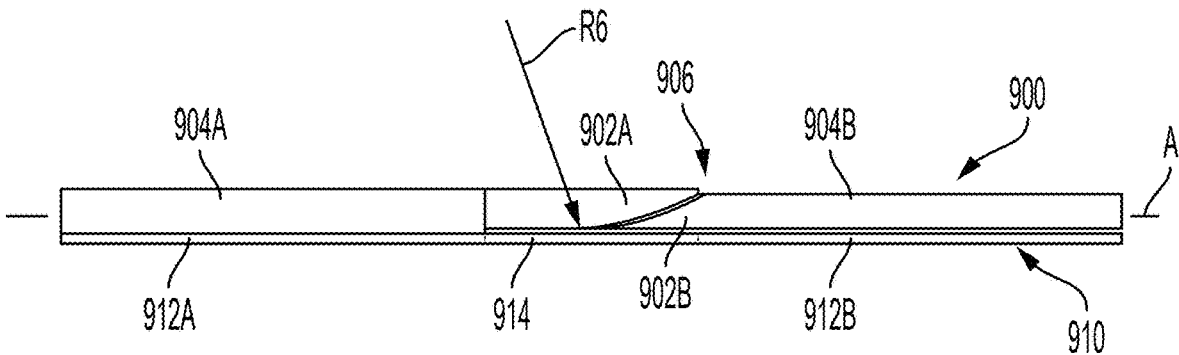
FIGS. 9A and 9B are side schematic views of a cover substrate attached to a frame having a sixth embodiment of a living hinge comprising sliding wedges in straight and bent configurations, respectively.
Figure 9B:
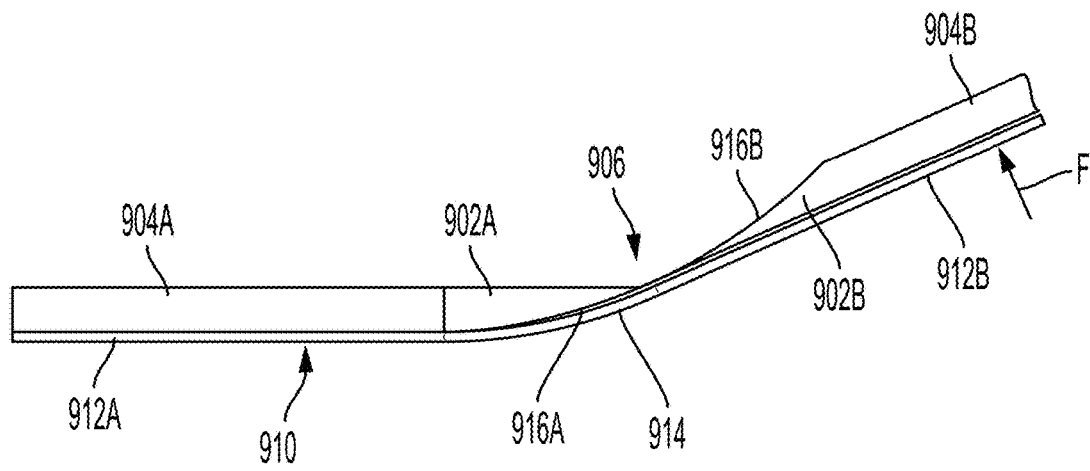

FIGS. 9A and 9B are side schematic views of frame 900 having a sixth embodiment of a living hinge comprising sliding wedges 902A and 902B in straight and bent configurations, respectively.

Frame 900 can comprise first frame portion 904A, second frame portion 904B and hinge portion 906. Frame 900 can be attached to cover substrate 910. Cover substrate 910 can comprise first panel portion 912A, second panel portion 912B and flexible panel portion 914. In one or more embodiments, one or both of the first panel portion 912A and the second panel portion 912B may be flat or substantially flat (e.g., having a radius of curvature greater than 10,000 mm, greater than 15,000 mm or greater than 20,000 mm). In one or more embodiments, one or both the first panel portion 912A and the second panel portion 912B may be curved (e.g., having a radius of curvature less than or equal to 10,000 mm, less than or equal to 15,000 mm or less than or equal to 20,000 mm). In one or more embodiments, one or both the first panel portion 912A and the second panel portion 912B may be cold-formed and curved, hot-formed and curved or cold-formed and hot-formed and curved.

Sliding wedges 902A and 902B can comprise extensions of first frame portion 904A and second frame portion 904B, respectively. Sliding wedges 902A and 902B can include bend faces 916A and 916B, respectively. First frame portion 904A and first sliding wedge 902A can be stationary to provide a fixed structure for frame 900 and so that first sliding wedge 902A can serve as a mandrel for flexible panel portion 914. Second frame portion 904B and second sliding wedge 902B can be movable relative to cover substrate 910 such that second frame portion 904B can slide against second panel portion 912B and second sliding wedge 902B can slide out of engagement with first sliding wedge 902A away from flexible panel portion 914. Although not shown in FIG. 9B, second frame portion 904B can slide to extend beyond a side-most end of second panel portion 912B.

In the embodiment of FIGS. 9A and 9B, sliding wedge 902A can act as a mandrel to control the curvature of flexible panel portion 914. Bend face 916A can have radius of curvature R6, which can be imparted to flexible panel portion 914 as sliding wedge 902B is drawn away from sliding wedge 902A. The force F of an operator pushing against panel portion 912B can be sufficient to cause second sliding wedge 902B to move away from first sliding wedge 902A. Bend face 916B can have a radius of curvature that substantially matches radius of curvature R6 having the same origin when in the straight or extended position of FIG. 9A. However, the origins or the radius of curvature of bend face 916B can become displaced from the origin of radius of curvature R6 when sliding wedge 902B is in the deployed or bent position of FIG. 9B. Sliding wedges 902A and 902B can provide full support to cover substrate 910 along all positions between the straight configuration of FIG. 9A and the fully bent configuration of FIG. 9B.

Instead of producing a constant radius of curvature R6 along hinge portion 906, sliding wedges 902A and 902B can be curved along other curvatures, such as parabolic, to produce other curvatures in hinge portion 906.

FIGS. 10A and 10B are side schematic views of frame 1000 having a first embodiment of a linked hinge comprising interlocking links 1002 in straight and bent configurations, respectively.

Frame 1000 can comprise first frame portion 1004A, second frame portion 1004B and hinge portion 1006. Frame 1000 can be attached to cover substrate 1010. Cover substrate 1010 can comprise first panel portion 1012A, second panel portion 1012B and flexible panel portion 1014. In one or more embodiments, one or both of the first panel portion 1012A and the second panel portion 1012B may be flat or substantially flat (e.g., having a radius of curvature greater than 10,000 mm, greater than 15,000 mm or greater than 20,000 mm). In one or more embodiments, one or both the first panel portion 1012A and the second panel portion 1012B may be curved (e.g., having a radius of curvature less than or equal to 10,000 mm, less than or equal to 15,000 mm or less than or equal to 20,000 mm). In one or more embodiments, one or both the first panel portion 1012A and the second panel portion 1012B may be cold-formed and curved, hot-formed and curved or cold-formed and hot-formed and curved. Frame 1000 can also comprise pinned couplings 1016.

Interlocking links 1002 can form pivotable linkages that rotate relative to each other as frame 1000 moves from the straight position of FIG. 10A to the bent position of FIG. 10B. Thus, frame 1000 avoids any bending or stretching of material that can potentially cause disruptions in the curvature of flexible panel portion 1014. Links 1002 can be of sufficiently short length, such as in the direction of left side 322 (FIG. 3B) to right side 324 (FIG. 3B) to avoid long sections of flatness against which flexible panel portion 1014 engages.

FIG. 10C is a cross-sectional view of the frame of FIG. 10B showing overhanging flex arrestors 1018 and 1020 of interlocking links 1002. Upper flex arrestors 1018 can have flat faces 1022 that extend perpendicular to axis A when frame 1000 is in the extended or straight position of FIG. 10A. Lower flex arrestors 1022 can have curved faces 1024. Faces 1022 can be configured to abut faces 1026 of an opposite link 1002. Faces 1024 can be configured to abut faces 1028 of an opposite link 1002.

As such, as links 1002 bend into a negative angle α (downward with reference to FIG. 10C), as depicted in FIG. 10C, faces 1028 of lower flex arrestors 1022 will engage opposing faces of an adjacent link 1002. Faces 1028 and the opposing faces can be angled relative to axis A, when in the straight or extended position of FIG. 10A, such that curved faces 1024 is permitted to slide against an opposing face of an adjacent link. The amount of angling of faces 1028 and their opposing faces determines the magnitude of negative angle α. In the deployed of flexed position of FIG. 10C, faces 1022 and faces 1026 can have an angle therebetween. However, as links 1002 are bent back to the straight position of FIG. 10A, faces 1028 can disengage from their opposing faces and faces 1022 and 1026 can be brought into engagement. Because faces 1022 and 1026 are perpendicular to axis A, faces 1022 and 1026 will not permit links 1002 to bend into a positive angle α (upward with reference to FIG. 10C). However, the angle between faces 1022 and 1026 can be adjusted to permit bending to a positive angle α. As mentioned, the length of links 1002 can be short such that the radius of curvature R7 of flexible panel portion 1014 can be kept constant. In an example, links 1002 can function similar to watchband links.

Instead of producing a constant radius of curvature R7 along hinge portion 1006, interlocking links 1002 can be configured to produce other curvatures, such as parabolic, by varying the length of various links 1002. For example, links 1002 near the center of hinge portion 1006 can be longer or shorter than links 1002 near frame portions 1004A and 1004B, with a gradient of trough heights being produced therebetween.

Figure 11A:
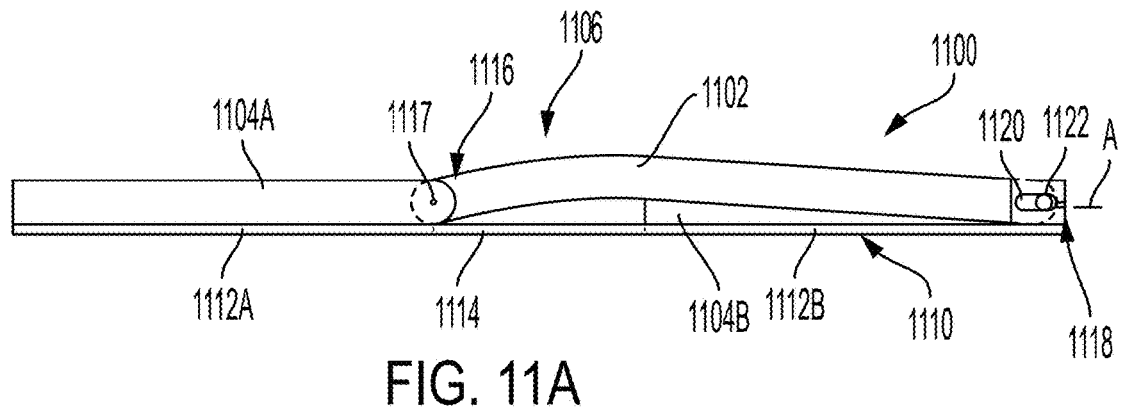
FIGS. 11A and 11B are side schematic views of a cover substrate attached to a frame having a second embodiment of a linked hinge comprising a rigid and curved pivoting arm in straight and bent configurations, respectively.
Figure 11B:
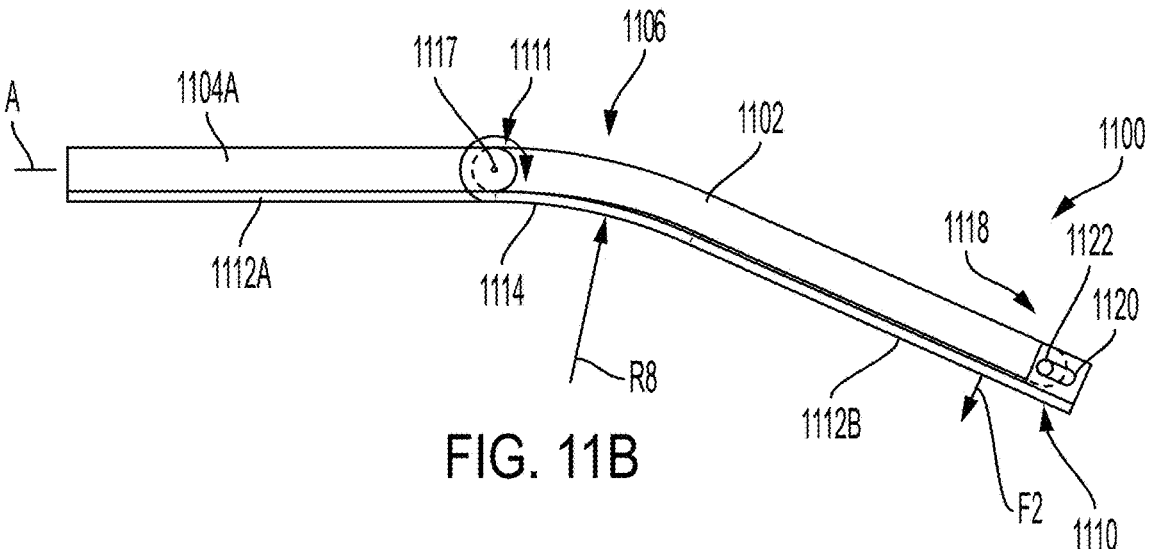

FIGS. 11A and 11B are side schematic views of frame 1100 substrate having a second embodiment of a linked hinge comprising rigid and curved pivoting arms 1102 in straight and bent configurations, respectively.

Frame 1100 can comprise first frame portion 1104A, second frame portion 1104B and hinge portion 1106. Frame 1100 can be attached to cover substrate 1110. Cover substrate 1110 can comprise first panel portion 1112A, second panel portion 1112B and flexible panel portion 1114. In one or more embodiments, one or both of the first panel portion 1112A and the second panel portion 1112B may be flat or substantially flat (e.g., having a radius of curvature greater than 10,000 mm, greater than 15,000 mm or greater than 20,000 mm). In one or more embodiments, one or both the first panel portion 1112A and the second panel portion 1112B may be curved (e.g., having a radius of curvature less than or equal to 10,000 mm, less than or equal to 15,000 mm or less than or equal to 20,000 mm). In one or more embodiments, one or both the first panel portion 1112A and the second panel portion 1112B may be cold-formed and curved, hot-formed and curved or cold-formed and hot-formed and curved. Frame 1100 can also comprise pivot coupling 1116, which can include pin 1117, and pivot coupling 1118, which can include slot 1120 and pin 1122.

Pivoting arms 1102 can extend between pivoting coupling 1116 and pivoting coupling 1118 in a curved, rigid manner. The length of pivoting arms 1102 along its curve is thus longer than the distance between pivot coupling 1116 and right side 324 (FIG. 30) of frame 1100. Thus, in the straight or extended position of FIG. 11A, pivoting arms 1102 can disengage from the back surfaces of cover substrate 1110, which can be supported by first frame portion 1104A and second frame portion 1104B. In such a position, pins 1122 in pivoting arms 1102 can reside at a distal end of slot 1120. In such a position, additional components can be added to frame 1100 between frame portions 1104A and 1104B to support flexible panel portion 1114.

In the deployed or flexed position, second panel portion 1112B can be moved forward in direction F2, which will cause pivoting arms 1102 to be brought into contact with cover substrate 1110. In particular flexible panel portion 1114 will be brought into contact with a length of pivoting arms 1102 having radius of curvature R8, thereby imparting the same radius of curvature to flexible panel portion 1114. The portion of pivoting arms 1102 having the curvature is offset to a side of pivoting arms 1102 coupled to first frame portion 1104A behind flexible panel portion 1114. In such a position, pins 1122 in pivoting arms 1102 can reside at a proximal end of slot 1120. Engagement of pivoting arms 1102 with cover substrate 1110 can additionally provide a lock-out or limiting mechanism to limit forward movement of frame 1100 in direction F2.

Instead of producing a constant radius of curvature R8 along hinge portion 1106, pivoting arms 1102 can be curved along other curvatures, such as parabolic, to produce other curvatures in hinge portion 1106.

Figure 12A:
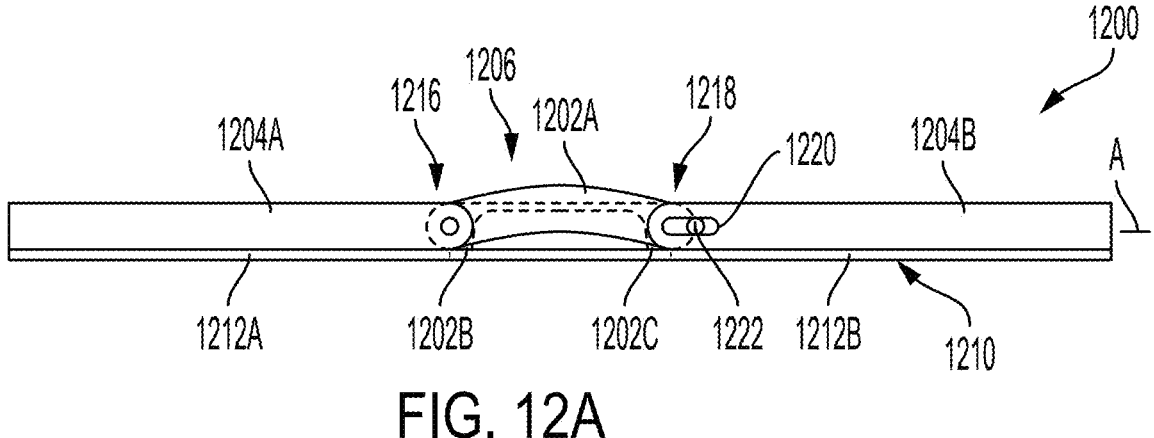
FIGS. 12A and 12B are side schematic views of a cover substrate attached to a frame having a third embodiment of a linked hinge comprising rigid and curved pivoting arms and flex-arresting bosses in straight and bent configurations, respectively.
Figure 12B:
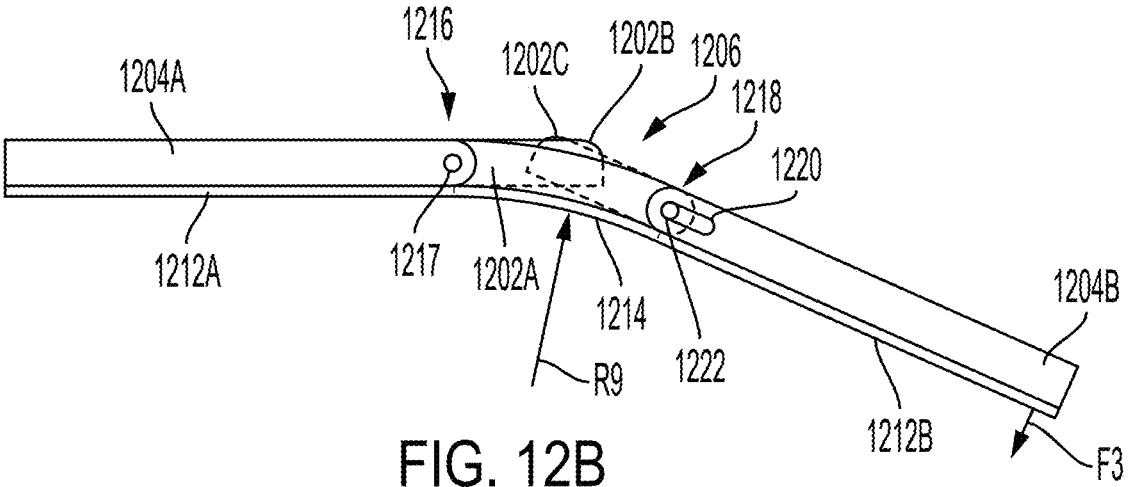

FIGS. 12A and 12B are side schematic views of frame 1200 having a third embodiment of a linked hinge comprising rigid and curved pivoting arms 1202A and flex-arresting bosses 1202B and 1202C in straight and bent configurations, respectively.

Frame 1200 can comprise first frame portion 1204A, second frame portion 1204B and hinge portion 1206. Frame 1200 can be attached to cover substrate 1210. Cover substrate 1210 can comprise first panel portion 1212A, second panel portion 1212B and flexible panel portion 1214. In one or more embodiments, one or both of the first panel portion 1212A and the second panel portion 1212B may be flat or substantially flat (e.g., having a radius of curvature greater than 10,000 mm, greater than 15,000 mm or greater than 20,000 mm). In one or more embodiments, one or both the first panel portion 1212A and the second panel portion 1212B may be curved (e.g., having a radius of curvature less than or equal to 10,000 mm, less than or equal to 15,000 mm or less than or equal to 20,000 mm). In one or more embodiments, one or both the first panel portion 1212A and the second panel portion 1212B may be cold-formed and curved, hot-formed and curved or cold-formed and hot-formed and curved. Frame 1200 can also comprise pivot coupling 1216, which can include pin 1217, and pivot coupling 1218, which can include slot 1220 and pin 1222.

Pivoting arms 1202A can extend between pivoting coupling 1216 and pivoting coupling 1218 in a curved, rigid manner. The length of pivoting arms 1102 along its curve is thus longer than the distance between pivot coupling 1216 and right side 324 (FIG. 30) of frame 1200. Thus, in the straight or extended position of FIG. 12A, pivoting arms 1102 can disengage from the back surfaces of cover substrate 1210, which can be supported by first frame portion 1204A and second frame portion 1204B. In such a position, pins 1222 in pivoting arms 1202 can reside at a distal end of slot 1220. In such a position, flex-arresting bosses 1202B and 1202C can extend from frame portions 1204A and 1204B, respectively, to support flexible panel portion 1214. As such, flex-arresting bosses 1202B and 1202C are not pinned at pins 1217 and 1222, but rather rigidly extend from frame portion 1204A and 1204B, respectively.

In the deployed or flexed position, second panel portion 1212B can be moved forward in direction F3, which will cause pivoting arms 1202 to be brought into contact with cover substrate 1210. In particular flexible panel portion 1214 will be brought into contact with a length of pivoting arms 1202 having radius of curvature R9, thereby imparting the same radius of curvature to flexible panel portion 1214. The portion of pivoting arms 1202 having the curvature can be centered on pivoting arms 1202 to be behind flexible panel portion 1214. In such a position, pins 1222 in pivoting arms 1202 can reside at a proximal end of slot 1220.

Engagement of pivoting arms 1202 with cover substrate 1210 can additionally provide a lock-out or limiting mechanism to limit forward movement of frame 1200 in direction F3.

Instead of producing a constant radius of curvature R9 along hinge portion 1206, pivoting arms 1202A can be curved along other curvatures, such as parabolic, to produce other curvatures in hinge portion 1206.

Figure 13A:
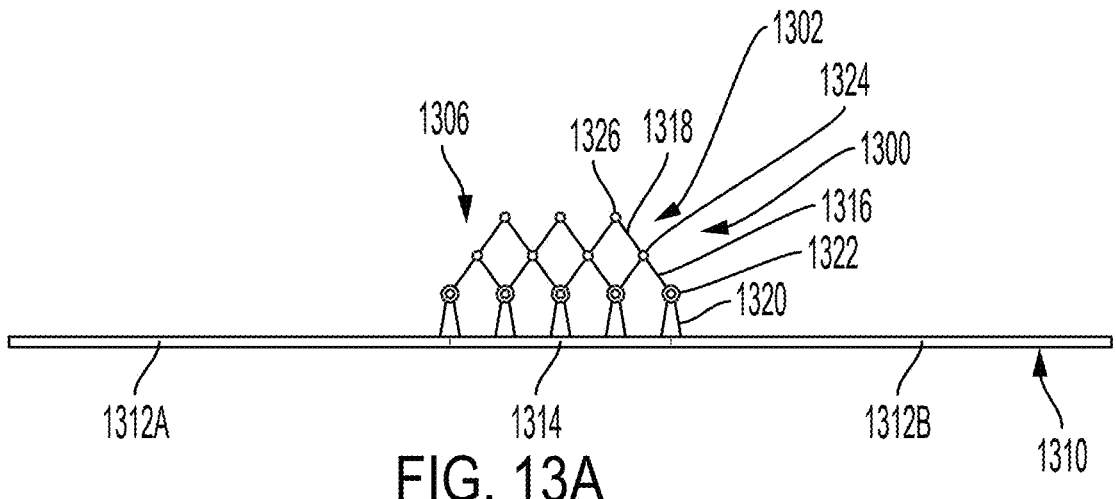
FIGS. 13A and 13B are side schematic views of a cover substrate attached to a frame having a fourth embodiment of a linked hinge comprising constrained linkages in straight and bent configurations, respectively.
Figure 13B:
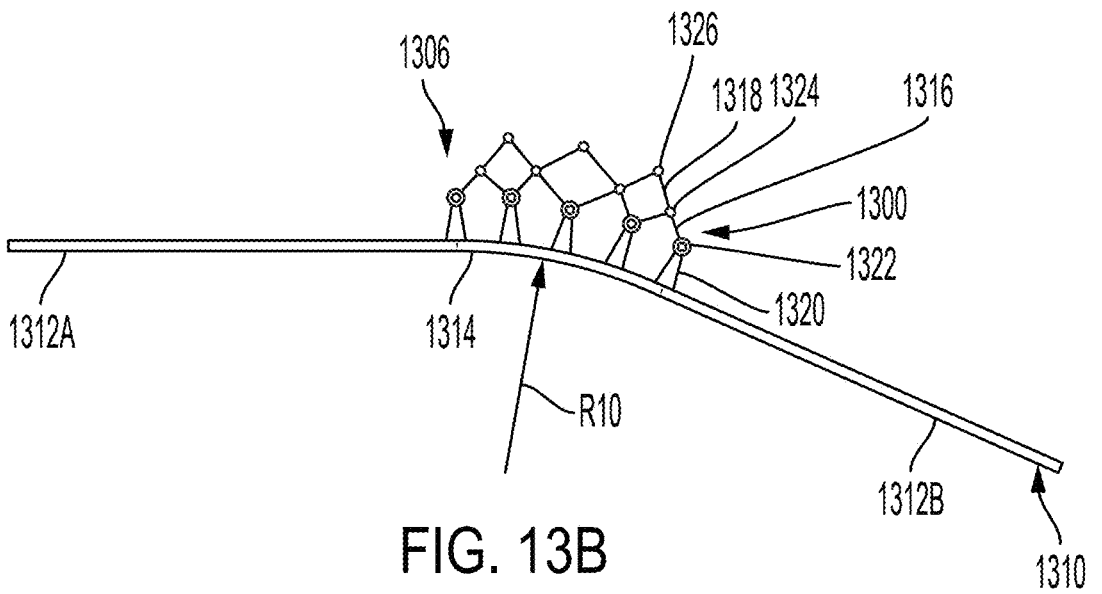

FIGS. 13A and 13B are side schematic views of frame 1300 having a fourth embodiment of a linked hinge comprising constrained linkages 1302 in straight and bent configurations, respectively.

Frame 1300 can comprise frame portions and a hinge portion as described herein, but are omitted from FIGS. 13A and 13B for clarity. Cover substrate 1310 can comprise first panel portion 1312A, second panel portion 1312B and flexible panel portion 1314. In one or more embodiments, one or both of the first panel portion 1312A and the second panel portion 1312B may be flat or substantially flat (e.g., having a radius of curvature greater than 10,000 mm, greater than 15,000 mm or greater than 20,000 mm). In one or more embodiments, one or both the first panel portion 1312A and the second panel portion 1312B may be curved (e.g., having a radius of curvature less than or equal to 10,000 mm, less than or equal to 15,000 mm or less than or equal to 20,000 mm). In one or more embodiments, one or both the first panel portion 1312A and the second panel portion 1312B may be cold-formed and curved, hot-formed and curved or cold-formed and hot-formed and curved.

Linkages 1302 can be arranged in two levels of linkages as first linkages 1316 and second linkages 1318. Linkages 1302 can be coupled to posts 1320. Posts 1302 can be attached directly to flexible panel portion 1314 or can be attached to a portion of a frame, as described herein, that abuts flexible panel portion 1314. Posts 1302 can comprise rigid pedestals that both provide rigidity to flexible panel portion 1314 and that provide pivot points for linkages 1302. First ends of first linkages 1316 can be coupled to posts 1302 at pivot points 1322. Second ends of first linkages 1316 can be coupled to each other at pivot points 1324. Pivot points 1324 can additionally have first ends of second linkages 1318 connected thereto. Second ends of second linkages 1318 can be connected to each other at pivot points 1326.

In the straight or extended position as shown in FIG. 13A, posts 1302 extend straight out from flexible panel portion 1314, first linkages 1316 are freely pivotable at pivot points 1322 and pivot points 1324, and second linkages 1318 are freely pivotable at pivot points 1324 and 1326. As such, second panel portion 1312B can be moved forward or backward relative to first panel portion 1312A. However, rather than be purely unconstrained in moving forward or backward, second linkages 1318 constrain the free forward and backward movement of first linkages 1316.

For example, without the presence of second linkages 1318, first linkages 1316 could rotate on pivot points 1324 in an uncontrolled manner. That is, for example, the left-most two first linkages 1316 of FIG. 13A could pivot at a pivot point 1324 more than the right-most two first linkages 1316 of FIG. 13A. As such, the resulting radius of curvature induced in flexible panel portion 1314 would be different.

With the presence of second linkages 1318, movement of first linkages 1316, though free to move backward or forward, is constrained. Movement of the left-most two first linkages 1316 of FIG. 13A at a pivot point 1324 cannot move without causing second linkages 1318 to also move. Second linkages 1318 connect the left-most two of first linkages 1316 with the right-most two of first linkages 1316, as those in between, such that no single first linkage 1316 can move without affecting the position of all the other first linkages 1316 via the presence of second linkages 1318. As such, the resulting radius of curvature induced in flexible panel portion 1314 will consistently have radius of curvature R10 throughout.

Instead of producing a constant radius of curvature R10 along hinge portion 1306, linkages 1302 can be configured to produce other curvatures, such as parabolic, by varying the length of various linkages 1302s. For example, linkages 1302 near the center of hinge portion 1306 can be longer or shorter than linkages 1302 near frame portions 1304A and 1304B, with a gradient of trough heights being produced therebetween.

Figures 14A, 14B, 14C, 14D:
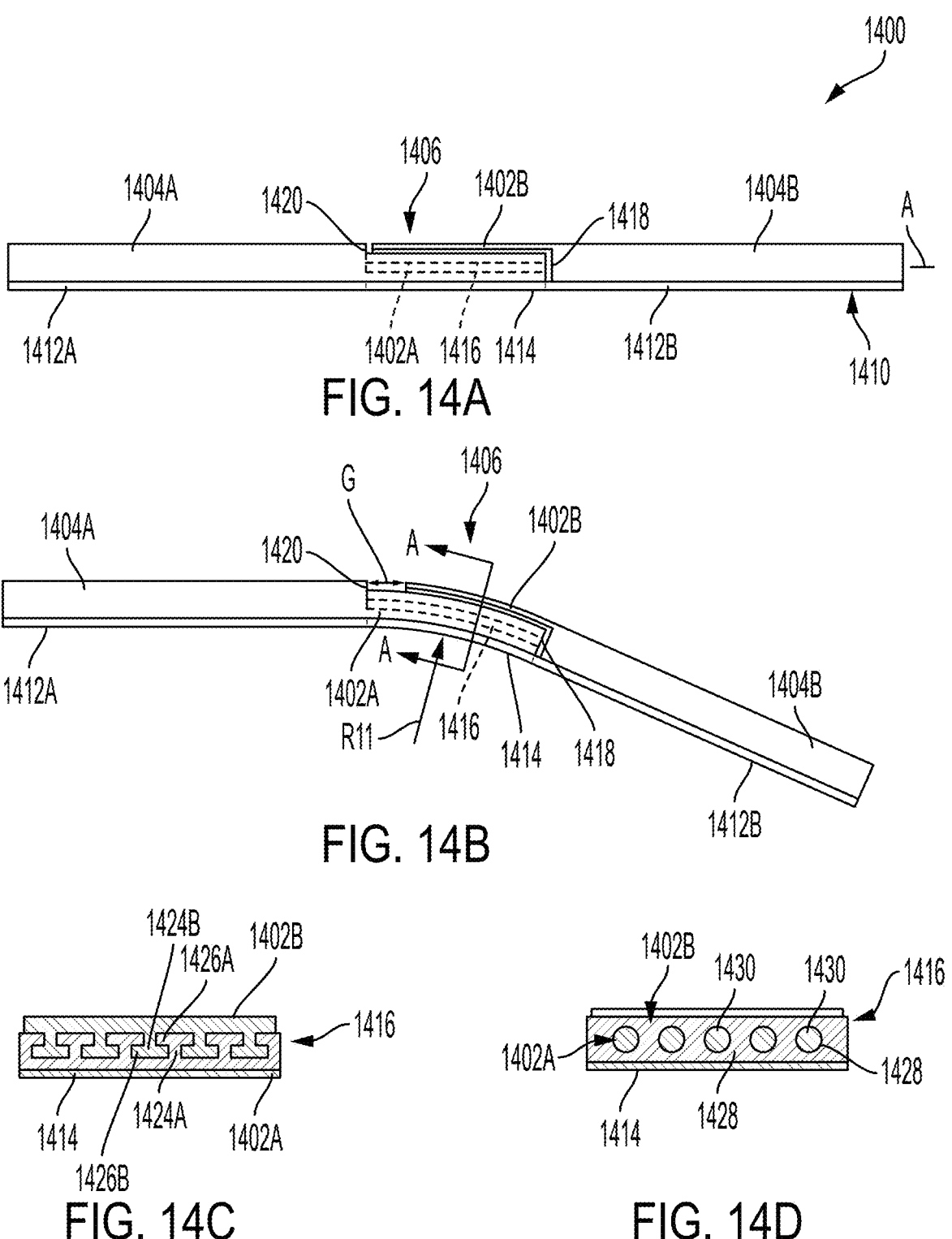
FIGS. 14A and 14B are side schematic views of a cover substrate attached to a frame having a first embodiment of a sliding hinge comprising sliding plates in straight and bent configurations, respectively.
FIGS. 14C and 14D are alternative cross-sectional views of the sliding plates of FIGS. 14A and 14B.

FIGS. 14A and 14B are side schematic views of frame 1400 having a first embodiment of a sliding hinge comprising sliding plates 1402A and 1402B in straight and bent configurations, respectively.

Frame 1400 can comprise first frame portion 1404A, second frame portion 1404B and hinge portion 1406. Frame 1400 can be attached to cover substrate 1410. Cover substrate 1410 can comprise first panel portion 1412A, second panel portion 1412B and flexible panel portion 1414. In one or more embodiments, one or both of the first panel portion 1412A and the second panel portion 1412B may be flat or substantially flat (e.g., having a radius of curvature greater than 10,000 mm, greater than 15,000 mm or greater than 20,000 mm). In one or more embodiments, one or both the first panel portion 1412A and the second panel portion 1412B may be curved (e.g., having a radius of curvature less than or equal to 10,000 mm, less than or equal to 15,000 mm or less than or equal to 20,000 mm). In one or more embodiments, one or both the first panel portion 1412A and the second panel portion 1412B may be cold-formed and curved, hot-formed and curved or cold-formed and hot-formed and curved.

Sliding plates 1402A and 1402B can be interconnected by rails 1416. In the straight configuration of FIG. 14A, sliding plate 1402A can abut shoulder 1418 of second frame portion 1404B and sliding plate 1402B can abut shoulder 1420 of first frame portion 1404A. In the deployed position, such as if second frame portion 1404B were advanced to a forward deployed position shown in FIG. 14B, sliding plates 1402A and 1402B can slide past each other. Sliding plate 1402A will remain in close proximity to second frame portion 1404B due to the continuity of cover substrate 1410 between second panel portion 1412B and flexible panel portion 1414. However, because first frame portion 1404A and second frame portion 1404B are unconstrained along axis A, second sliding plate 1402B can move away from first frame portion 1404A to form gap G adjacent shoulder 1420.

FIGS. 14C and 14D are alternative cross-sectional views of the sliding plates 1402A and 1402B taken at section A-A of FIG. 14B showing two examples of rails 1416.

FIG. 14C shows rails 1416 comprising interconnected T-posts 1424A and 1424B. First T-posts 1424 can include horizontal extensions 1426A and second T-posts 1424 can include horizontal extensions 1426B. Horizontal extensions 1426A and 1426B can overlap to prevent transverse separation of sliding plates 1402A and 1402B, but that facilitate longitudinal sliding from side to side.

FIG. 14D shows rails 1416 comprising tubes 1428 and ligaments 1430. Ligaments 1430 can be disposed within tubes 1428 to prevent transverse separation of sliding plates 1402A and 1402B, but that facilitate longitudinal sliding from side to side. In the illustrated example, tubes 1428 and ligaments 1430 are circular, but other cross-sectional shapes can be used.

Instead of producing a constant radius of curvature R11 along hinge portion 1406, sliding plates 1402A and 1402B can be configured to produce other curvatures, such as parabolic, by varying the thicknesses and stiffnesses of sliding plates 1402A and 1402B along their lengths.

Figure 15:
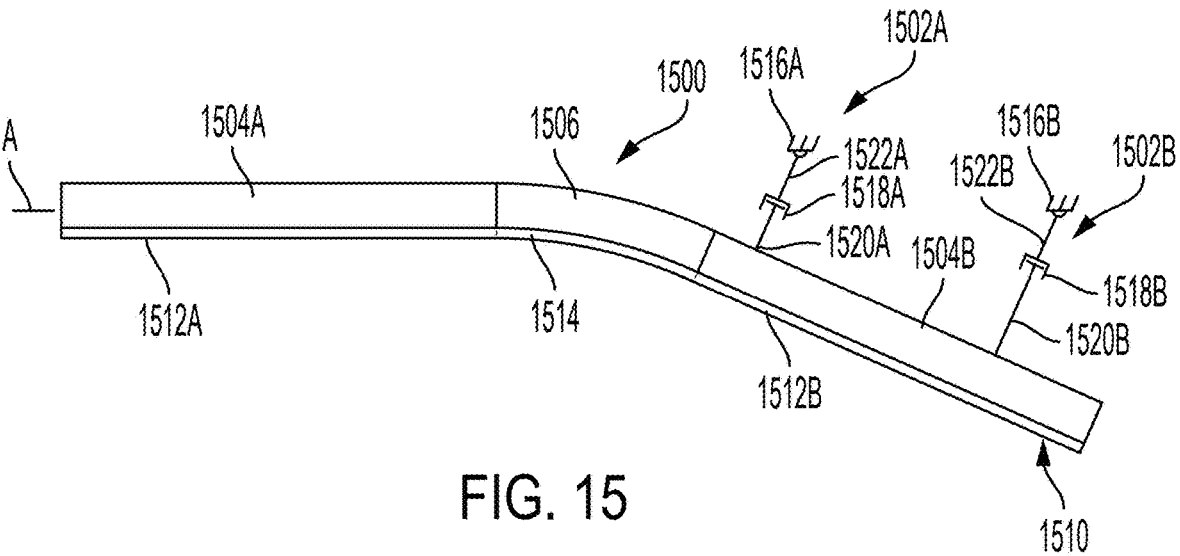
FIG. 15 is a side schematic views of a cover substrate attached to a frame having dampers attached thereto.

FIG. 15 is a side schematic views of frame 1500 having dampers 1502A and 1502B attached thereto.

Frame 1500 can comprise first frame portion 1504A, second frame portion 1504B and hinge portion 1506. Frame 1500 can be attached to cover substrate 1510. Cover substrate 1510 can comprise first panel portion 1512A, second panel portion 1512B and flexible panel portion 1514. In one or more embodiments, one or both of the first panel portion 1512A and the second panel portion 1512B may be flat or substantially flat (e.g., having a radius of curvature greater than 10,000 mm, greater than 15,000 mm or greater than 20,000 mm). In one or more embodiments, one or both the first panel portion 1512A and the second panel portion 1512B may be curved (e.g., having a radius of curvature less than or equal to 10,000 mm, less than or equal to 15,000 mm or less than or equal to 20,000 mm). In one or more embodiments, one or both the first panel portion 1512A and the second panel portion 1512B may be cold-formed and curved, hot-formed and curved or cold-formed and hot-formed and curved. Frame 1500 is representative of any of the frames discussed herein, such as frames 400, 500, 600, 700, 800, 900, 1000, 1100, 1200, 1300 and 1400.

Damper 1502A can extend from fixed anchor point 1516A to second frame portion 1504B. Damper 1502A can include device 1518A that can be connected to linkages 1520A and 1522A.

Damper 1502B can extend from fixed anchor point 1516B to second frame portion 1504B. Damper 1502B can include device 1518B that can be connected to linkages 1520B and 1522B.

Devices 1518A and 1518B can comprise any suitable dampers as are known in the art. For example, devices 1518A and 1518B can comprise pieces of material that are soft, relative to the other components, such as rubber stoppers. Devices 1518A and 1518B can additionally comprise components that crumple according to a pre-designed mechanism to absorb energy. Devices 1518A and 1518B can additionally comprise hydraulic dashpots or springs.

The systems and methods of the present application result in dynamically bendable cover substrate assemblies that are rugged, easy to manufacture and support bendable cover substrates in such a manner that results in a smooth, continuous bending of the cover substrate. The frames described herein allow the cover substrates to bend on their own accord, but constrain or dictate such bending such that the cover substrates undergo a controlled bending that is evenly distributed along the arc length of the bending so that the presence of discontinuities between adjacent flat portions and the bent portion is minimized and a constant radius of curvature results.

Aspect (1) of this disclosure pertains to a display assembly for an automotive interior, the display assembly comprising: a dynamically bendable cover panel comprising: a first panel portion; a second panel portion; and a flexible panel portion connecting the first panel portion and the second panel portion; a display adjacent the first panel portion and the second panel portion; and a frame supporting the dynamically bendable cover panel, the frame comprising: a first frame portion for supporting the first panel portion; a second frame portion for supporting the second panel portion; and a hinge portion coupling the first frame portion and the second frame portion, the hinge portion configured to induce a curvature having smoothly connected arc segments in the flexible panel portion between the first panel portion and the second panel portion when the second frame portion is articulated relative to the first frame portion from a straight position to a deployed position.

Aspect (2) pertains to the display assembly of Aspect (1), wherein the hinge portion comprises a living hinge.

Aspect (3) pertains to the display assembly of Aspect (2), wherein the living hinge comprises a mechanical weakening of the frame in the hinge portion.

Aspect (4) pertains to the display assembly of Aspect (3), wherein the living hinge comprises a plurality of longitudinal slots extending across the hinge portion proximate the flexible panel portion.

Aspect (5) pertains to the display assembly of Aspect (4), wherein each of the plurality of longitudinal slots comprises: a trough extending parallel to the flexible panel portion; and abutment surfaces extending from the trough, wherein a spacing between the abutment surfaces is smaller than a width of the trough when the hinge portion is in the straight position.

Aspect (6) pertains to the display assembly of Aspect (4), wherein each of the plurality of longitudinal slots comprises overhanging flex arresters.

Aspect (7) pertains to the display assembly of Aspect (6), wherein the overhanging flex arrestors comprise: a first projection extending transversely from the hinge portion; a second projection extending transversely from the hinge portion spaced from the first projection; a cross member extending longitudinally from the second projection spaced from the hinge portion; and a tab extending transversely from the cross member toward the hinge portion on an opposite side of the first projection as the second projection.

Aspect (8) pertains to the display assembly of Aspect (3), wherein the hinge portion comprises a plurality of transverse slots extending through the hinge portion transverse to the flexible panel portion.

Aspect (9) pertains to the display assembly of Aspect (8), wherein the plurality of transverse slots is arranged in offset rows and columns.

Aspect (10) pertains to the display assembly of Aspect (2), wherein the first frame portion, the second frame portion and the hinge portion of the frame are a monolithic structure.

Aspect (11) pertains to the display assembly of Aspect (10), wherein the living hinge comprises: a first end; a second end; and a middle portion extending between the first end and the second end, wherein the middle portion has a cross-sectional profile of varying thickness to control bending of the living hinge.

Aspect (12) pertains to the display assembly of Aspect (11), wherein the middle portion is thicker than the first end and the second end.

Aspect (13) pertains to the display assembly of any one of Aspects (1) through (12), further comprising a mandrel having the shape of the circular arc segment.

Aspect (14) pertains to the display assembly of Aspect (13), wherein the hinge portion of the frame comprises the mandrel.

Aspect (15) pertains to the display assembly of Aspect (14), wherein the second frame portion is slidable relative to the second panel portion and includes a surface configured to mate flush with the mandrel such that when the second panel portion is slid into engagement with the mandrel the frame is in the straight position and when the second panel portion is slid out of engagement with the mandrel the frame is in the deployed position.

Aspect (16) pertains to the display assembly of Aspect (13), wherein the first frame portion, the second frame portion and the hinge portion of the frame are a monolithic structure and the mandrel is positioned behind the hinge portion.

Aspect (17) pertains to the display assembly of any one of Aspects (1) through (16), wherein the hinge portion comprises a plurality of hinge linkages pinned to the first frame portion and the second frame portion.

Aspect (18) pertains to the display assembly of Aspect (17), wherein the each of the plurality of hinge linkages comprises: a first deflector for arresting movement in the straight position; and a second deflector for arresting movement in the deployed position.

Aspect (19) pertains to the display assembly of Aspect (17), wherein the plurality of hinge linkages comprises an elongate, curved linkage having a first end pinned to the first frame portion, a middle member configured to extend across the flexible panel portion and at least a portion of the second panel portion, and a second end pinned to the second frame portion at a slot, wherein the second frame portion extends over only a portion of the second panel portion.

Aspect (20) pertains to the display assembly of Aspect (19), wherein the elongate curved linkage is configured to engage the flexible panel portion in the deployed position and disengage from the flexible panel portion in the straight position.

Aspect (21) pertains to the display assembly of Aspect (17), wherein the plurality of hinge linkages comprises: a curved linkage pinned to the first frame portion, extending across the flexible panel portion and pinned to the second frame portion at a slot; a first straight boss rigidly extending from the first panel portion at least partially across the flexible panel portion; and a second straight boss rigidly extending from the second panel portion at least partially across the flexible panel portion; wherein in the straight position, the first and second straight bosses engage the flexible panel portion and in the deployed position the curved linkage engages the flexible panel portion.

Aspect (22) pertains to the display assembly of Aspect (17), wherein the plurality of hinge linkages comprises a scissor mechanism.

Aspect (23) pertains to the display assembly of Aspect (22), wherein the scissor mechanism comprises: a plurality of posts extending from behind the flexible panel portion, each of the plurality of posts having a pivot point at a free end thereof; a plurality of first linkages extending from the pivot points at a first end and joined to an adjacent first linkage at a second end; and a plurality of second linkages extending from the second ends of the first linkages at a third end and joined to an adjacent second linkage at a fourth end.

Aspect (24) pertains to the display assembly of any one of Aspects (1) through (23), wherein the hinge portion comprises a sliding mechanism.

Aspect (25) pertains to the display assembly of Aspect (24), wherein the sliding mechanism comprises: a first set of rails extending from the first frame portion; and a second set of rails extending from the second frame portion; wherein the first and second sets of rails comprise the hinge portion; and wherein the first set of rails can slide freely along the second set of rails.

Aspect (26) pertains to the display assembly of any one of Aspects (1) through (25), further comprising a damper to control movement of the hinge portion between the straight and deployed positions.

Aspect (27) pertains to the display assembly of any one of Aspects (1) through (26), wherein the damper is selected from the group consisting of a hydraulic dashpot, a spring, a crumple device and a rubber stopper.

Aspect (28) pertains to the display assembly of any one of Aspects (1) through (27), wherein the hinge portion is configured to induce a radius of curvature having a circular arc segment in the flexible panel portion between the first panel portion and the second panel portion.

Aspect (29) pertains to a display assembly for an automotive interior, the display assembly comprising: a dynamically bendable cover panel comprising: a first panel portion; a second panel portion; and a flexible panel portion connecting the first panel portion and the second panel portion; a display adjacent the first panel portion and the second panel portion; and a frame supporting the dynamically bendable cover panel, the frame comprising: a first frame portion for supporting the first panel portion; a second frame portion for supporting the second panel portion; and a living hinge coupling the first frame portion and the second frame portion.

Aspect (30) pertains to the display assembly of Aspect (29), wherein the living hinge comprises a mechanical weakening of the frame in the hinge portion.

Aspect (31) pertains to the display assembly of Aspect (30), wherein the living hinge comprises a plurality of longitudinal slots extending across the hinge portion proximate the flexible panel portion.

Aspect (32) pertains to the display assembly of Aspect (31), wherein each of the plurality of longitudinal slots comprises: a flat trough extending parallel to the flexible panel portion; and abutment surfaces extending from the flat trough, wherein a spacing between the abutment surfaces is smaller than a width of the flat trough when the hinge portion is in the straight position.

Aspect (33) pertains to the display assembly of Aspect (31), wherein each of the plurality of longitudinal slots comprises overhanging flex arresters.

Aspect (34) pertains to the display assembly of Aspect (33), wherein the overhanging flex arrestors comprise: a first projection extending transversely from the hinge portion; a second projection extending transversely from the hinge portion spaced from the first projection; a cross member extending longitudinally from the second projection spaced from the hinge portion; and a tab extending transversely from the cross member toward the hinge portion on an opposite side of the first projection as the second projection.

Aspect (35) pertains to the display assembly of Aspect (30), wherein the hinge portion comprises a plurality of transverse slots extending through the hinge portion transverse to the flexible panel portion.

Aspect (36) pertains to the display assembly of Aspect (35), wherein the plurality of transverse slots is arranged in offset rows and columns.

Aspect (37) pertains to the display assembly of any one of Aspects (29) through (36), wherein the first frame portion, the second frame portion and the hinge portion of the frame are a monolithic structure.

Aspect (38) pertains to the display assembly of Aspect (37), wherein the living hinge comprises: a first end; a second end; and a middle portion extending between the first end and the second end, wherein the middle portion has a cross-sectional profile of varying thickness to control bending of the living hinge.

Aspect (39) pertains to the display assembly of Aspect (38), wherein the middle portion is thicker than the first end and the second end.

Aspect (40) pertains to a display assembly for an automotive interior, the display assembly comprising: a dynamically bendable cover panel comprising: a first panel portion; a second panel portion; and a flexible panel portion connecting the first panel portion and the second panel portion; a display adjacent the first panel portion and the second panel portion; a frame supporting the dynamically bendable cover panel, the frame comprising: a first frame portion for supporting the first panel portion; a second frame portion for supporting the second panel portion; and a hinge portion coupling the first frame portion and the second frame portion; and a mandrel positioned behind the flexible panel portion, the mandrel having the shape of the circular arc segment.

Aspect (41) pertains to the display assembly of Aspect (40), wherein the hinge portion of the frame comprises the mandrel.

Aspect (42) pertains to the display assembly of Aspect (41), wherein the second frame portion is slidable relative to the second panel portion and includes a surface configured to mate flush with the mandrel such that when the second panel portion is slid into engagement with the mandrel the frame is in the straight position and when the second panel portion is slid out of engagement with the mandrel the frame is in the deployed position.

Aspect (43) pertains to the display assembly of Aspect (40), wherein the first frame portion, the second frame portion and the hinge portion of the frame are a monolithic structure and the mandrel is positioned behind the hinge portion.

Aspect (44) pertains to a display assembly for an automotive interior, the display assembly comprising: a dynamically bendable cover panel comprising: a first panel portion; a second panel portion; and a flexible panel portion connecting the first panel portion and the second panel portion; a display adjacent the first panel portion and the second panel portion; and a frame supporting the dynamically bendable cover panel, the frame comprising: a first frame portion for supporting the first panel portion; a second frame portion for supporting the second panel portion; and a plurality of hinge linkages pinned to the first frame portion and the second frame portion.

Aspect (45) pertains to the display assembly of Aspect (44), wherein the each of the plurality of hinge linkages comprises: a first deflector for arresting movement in the straight position; and a second deflector for arresting movement in the deployed position.

Aspect (46) pertains to the display assembly of Aspect (44), wherein the plurality of hinge linkages comprises an elongate, curved linkage having a first end pinned to the first frame portion, a middle member configured to extend across the flexible panel portion and at least a portion of the second panel portion, and a second end pinned to the second frame portion at a slot, wherein the second frame portion extends over only a portion of the second panel portion.

Aspect (47) pertains to the display assembly of Aspect (46), wherein the elongate curved linkage is configured to engage the flexible panel portion in the deployed position and disengage from the flexible panel portion in the straight position.

Aspect (48) pertains to the display assembly of Aspect (44), wherein the plurality of hinge linkages comprises: a curved linkage pinned to the first frame portion, extending across the flexible panel portion and pinned to the second frame portion at a slot; a first straight boss rigidly extending from the first panel portion at least partially across the flexible panel portion; and a second straight boss rigidly extending from the second panel portion at least partially across the flexible panel portion; wherein in the straight position, the first and second straight bosses engage the flexible panel portion and in the deployed position the curved linkage engages the flexible panel portion.

Aspect (49) pertains to the display assembly of Aspect (44), wherein the plurality of hinge linkages comprises a scissor mechanism.

Aspect (50) pertains to the display assembly of Aspect (49), wherein the scissor mechanism comprises: a plurality of posts extending from behind the flexible panel portion, each of the plurality of posts having a pivot point at a free end thereof; a plurality of first linkages extending from the pivot points at a first end and joined to an adjacent first linkage at a second end; and a plurality of second linkages extending from the second ends of the first linkages at a third end and joined to an adjacent second linkage at a fourth end.

Aspect (51) pertains to a display assembly for an automotive interior, the display assembly comprising: a dynamically bendable cover panel comprising: a first panel portion; a second panel portion; and a flexible panel portion connecting the first panel portion and the second panel portion; a display adjacent the first panel portion and the second panel portion; and a frame supporting the dynamically bendable cover panel, the frame comprising: a first frame portion for supporting the first panel portion; a second frame portion for supporting the second panel portion; and a sliding hinge mechanism coupling the first frame portion and the second frame portion.

Aspect (52) pertains to the display assembly of Aspect (51), wherein the sliding mechanism comprises: a first set of rails extending from the first frame portion; and a second set of rails extending from the second frame portion; wherein the first and second sets of rails comprise the hinge portion; and wherein the first set of rails can slide freely along the second set of rails.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72 (b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

We claim:

1. A display assembly comprising:
a dynamically bendable cover panel comprising:
a display adjacent the dynamically bendable cover panel; and
a frame supporting the dynamically bendable cover panel, the frame comprising a hinge portion configured to induce a curvature in the dynamically bendable cover panel in the shape of an arc segment; and
a mandrel disposed behind the frame and having the shape of the arc segment, wherein the frame contacts the mandrel when the frame induces the curvature.

2. The display assembly of claim 1, wherein the mandrel comprises a bend face against which the frame is pushed when the curvature is induced in the dynamically bendable cover panel.

3. The display assembly of claim 2, wherein the bend face comprises an arc length that is longer than the hinge portion of the frame.

4. The display assembly of claim 2, wherein the bend face exhibits a constant radius of curvature such that the arc segment is in the shape of a circular arc.

5. The display assembly of claim 2, wherein the bend face exhibits a varying radius of curvature so that the arc segment does not exhibit a circular shape.

6. The display assembly of claim 1, wherein the dynamically bendable cover panel comprises a first portion and a second portion, wherein the first portion is articulated to an off-angle relative to the second portion when the curvature is induced.

7. The display assembly of claim 6, wherein the display disposed adjacent the first portion and the second portion.

8. The display assembly of claim 7, wherein one of the first portion and the second portion is flat or substantially flat.

9. The display assembly of claim 8, wherein both the first portion and the second portion are flat when the curvature is induced.

10. The display assembly of claim 6, wherein the frame comprises a first frame portion supporting the first portion and a second frame portion supporting the second portion, wherein the hinge portion is disposed between the first frame portion and the second frame portion.

11. The display assembly of claim 6, wherein the first frame portion, the second frame portion and the hinge portion of the frame are a monolithic structure.

12. The display assembly of claim 1, wherein an arc length of the arc segment varies in proportion to a degree of bending of the dynamically bendable cover panel, but a radius of curvature of the arc segment remains constant despite the degree of bending.

13. A vehicular interior system comprising:
a dynamically bendable cover panel comprising:
a display adjacent the dynamically bendable cover panel; and
a frame supporting the dynamically bendable cover panel, the frame comprising a hinge portion configured to induce a curvature in the dynamically bendable cover panel in the shape of an arc segment; and
a mandrel disposed behind the frame and having the shape of the arc segment,
wherein the frame contacts the mandrel when the frame induces the curvature,
wherein, when the curvature is induced, a first portion of the dynamically bendable cover panel is articulated relative to a second portion of the dynamically bendable cover panel while the second portion remains fully supported by a structure of the vehicle interior system.

14. The vehicle interior system of claim 13, wherein the mandrel comprises a bend face against which the frame is pushed when the curvature is induced in the dynamically bendable cover panel.

15. The vehicle interior system of claim 14, wherein the bend face comprises an arc length that is longer than the hinge portion of the frame.

16. The vehicle interior system of claim 14, wherein the bend face exhibits a constant radius of curvature such that the arc segment is in the shape of a circular arc.

17. The vehicle interior system of claim 14, wherein the bend face exhibits a varying radius of curvature so that the arc segment does not exhibit a circular shape.

18. The vehicle interior system of claim 13, wherein the frame comprises a first frame portion supporting the first portion and a second frame portion supporting the second portion, wherein the hinge portion is disposed between the first frame portion and the second frame portion.

19. The vehicle interior system of claim 18, wherein the first frame portion, the second frame portion and the hinge portion of the frame are a monolithic structure.

20. The vehicle interior system of claim 13, wherein an arc length of the arc segment varies in proportion to a degree of bending of the dynamically bendable cover panel, but a radius of curvature of the arc segment remains constant despite the degree of bending.

\* \* \* \* \*